(12) United States Patent
Guerra Filho et al.

(10) Patent No.: US 12,100,109 B2
(45) Date of Patent: Sep. 24, 2024

(54) GENERATING ADAPTED VIRTUAL CONTENT TO SPATIAL CHARACTERISTICS OF A PHYSICAL SETTING

(71) Applicant: Apple Inc., Cupertino, CA (US)

(72) Inventors: Gutemberg B. Guerra Filho, El Dorado Hills, CA (US); Raffi A. Bedikian, Mountain View, CA (US); Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 140 days.

(21) Appl. No.: 17/484,996

(22) Filed: Sep. 24, 2021

(65) Prior Publication Data

US 2022/0012951 A1     Jan. 13, 2022

Related U.S. Application Data

(63) Continuation of application No. PCT/US2020/038398, filed on Jun. 18, 2020.
(Continued)

(51) Int. Cl.
    *G06F 3/01*         (2006.01)
    *G06F 3/0481*     (2022.01)
    (Continued)

(52) U.S. Cl.
    CPC ............ *G06T 19/006* (2013.01); *G06F 3/011* (2013.01); *G06T 7/246* (2017.01); *G06T 19/003* (2013.01);
    (Continued)

(58) Field of Classification Search
None
See application file for complete search history.

(56) References Cited

U.S. PATENT DOCUMENTS 11,361,270 B2 *   6/2022   Feng ................... G06Q 10/1097
2017/0273552 A1   9/2017   Leung et al.
(Continued)

FOREIGN PATENT DOCUMENTS

EP      3663188 A1     6/2020

OTHER PUBLICATIONS

Jean-Paul Rodrigue, "Connectivity Matrix", 2023, retrieved from "https://transportgeography.org/contents/methods/graph-theory-definition-properties/connectivity-matrix/" (Year: 2023).*

(Continued)

*Primary Examiner* — Michael J Cobb
(74) *Attorney, Agent, or Firm* — Fernando & Partners, LLP

(57) ABSTRACT

In some implementations, a method includes: identifying a plurality of subsets associated with a physical environment; determining a set of spatial characteristics for each of the plurality of subsets, wherein a first set of spatial characteristics characterizes dimensions of a first subset and a second set of spatial characteristics characterizes dimensions of a second subset; generating an adapted first extended reality (XR) content portion for the first subset based at least in part on the first set of spatial characteristics; generating an adapted second XR content portion for the second subset based at least in part on the second set of spatial characteristics; and generating one or more navigation options that allow a user to traverse between the first and second subsets based on the first and second sets of spatial characteristics.

28 Claims, 17 Drawing Sheets

Related U.S. Application Data

(60) Provisional application No. 62/866,122, filed on Jun. 25, 2019.

(51) Int. Cl.
  *G06F 3/0488* (2022.01)
  *G06T 7/246* (2017.01)
  *G06T 19/00* (2011.01)
  *G06T 19/20* (2011.01)

(52) U.S. Cl.
  CPC ............... *G06T 2207/30242* (2013.01); *G06T 2207/30244* (2013.01)

(56) References Cited

U.S. PATENT DOCUMENTS

| | | | |
|---|---|---|---|
| 2020/0074749 A1* | 3/2020 | Greasley | G06T 19/20 |
| 2022/0189122 A1* | 6/2022 | Li | G06Q 30/0623 |
| 2023/0060150 A1* | 3/2023 | Chen | G06F 3/017 |
| 2023/0196684 A1* | 6/2023 | Li | G06F 3/04815 345/419 |
| 2024/0161348 A1* | 5/2024 | Hutchcroft | G06T 7/60 |

OTHER PUBLICATIONS

Paulo de Oliverira Rente, Catarina Brites, Joao Ascenso, Fernando Pereira, "Graph-Based Static 3D Point Clouds Geometry Coding", 2019, IEEE Transactions on Multimedia 21(2):284-299 (Year: 2019).*

PCT International Search Report and Written Opinion dated Sep. 28, 2020, International Application No. PCT/US2020/038398, pp. 1-12.

Examination Report for corresponding European Appl. No. 20745346.5 dated Feb. 8, 2023, 7 pages.

P C Van Kluijven: "Augmented reality used in navigation. Project 2 Theme: improvement and innovation Content",, Feb. 5, 2013, XP055199421, Retrieved from the Internet: URL:http://www.maritimesymposium-rotterdam.nl/uploads/Route/Augmented Reality On The Bridge.pdf.

* cited by examiner

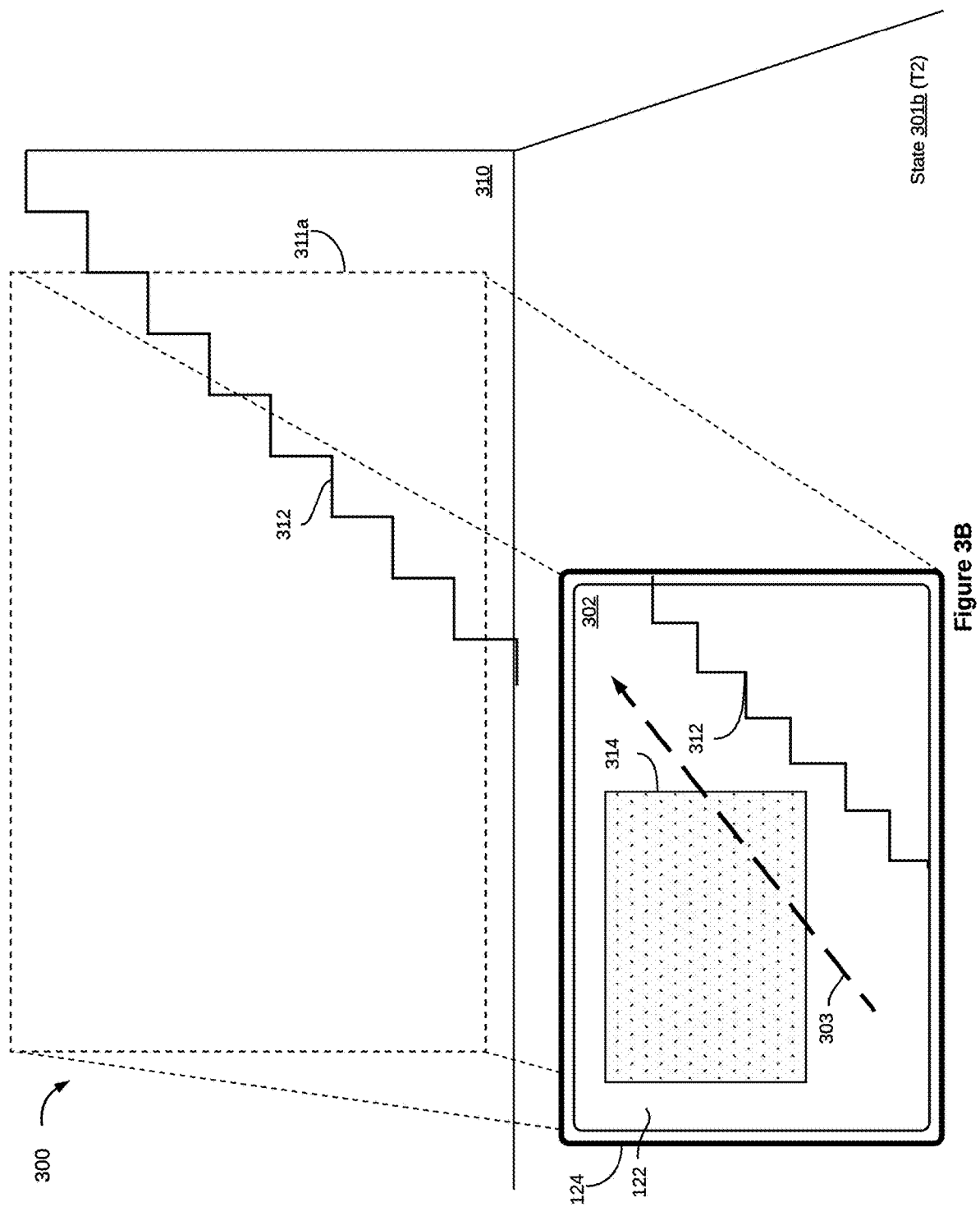

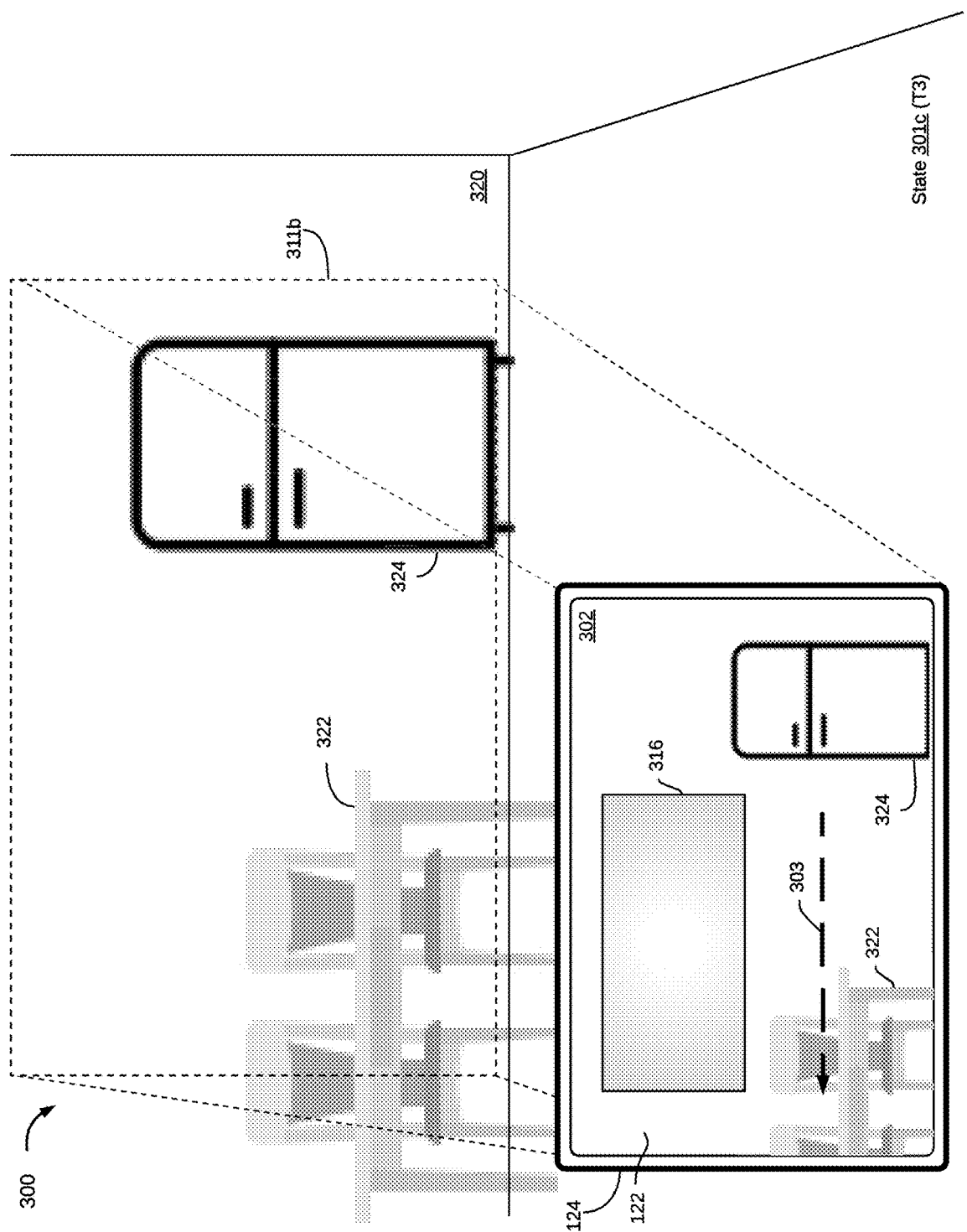

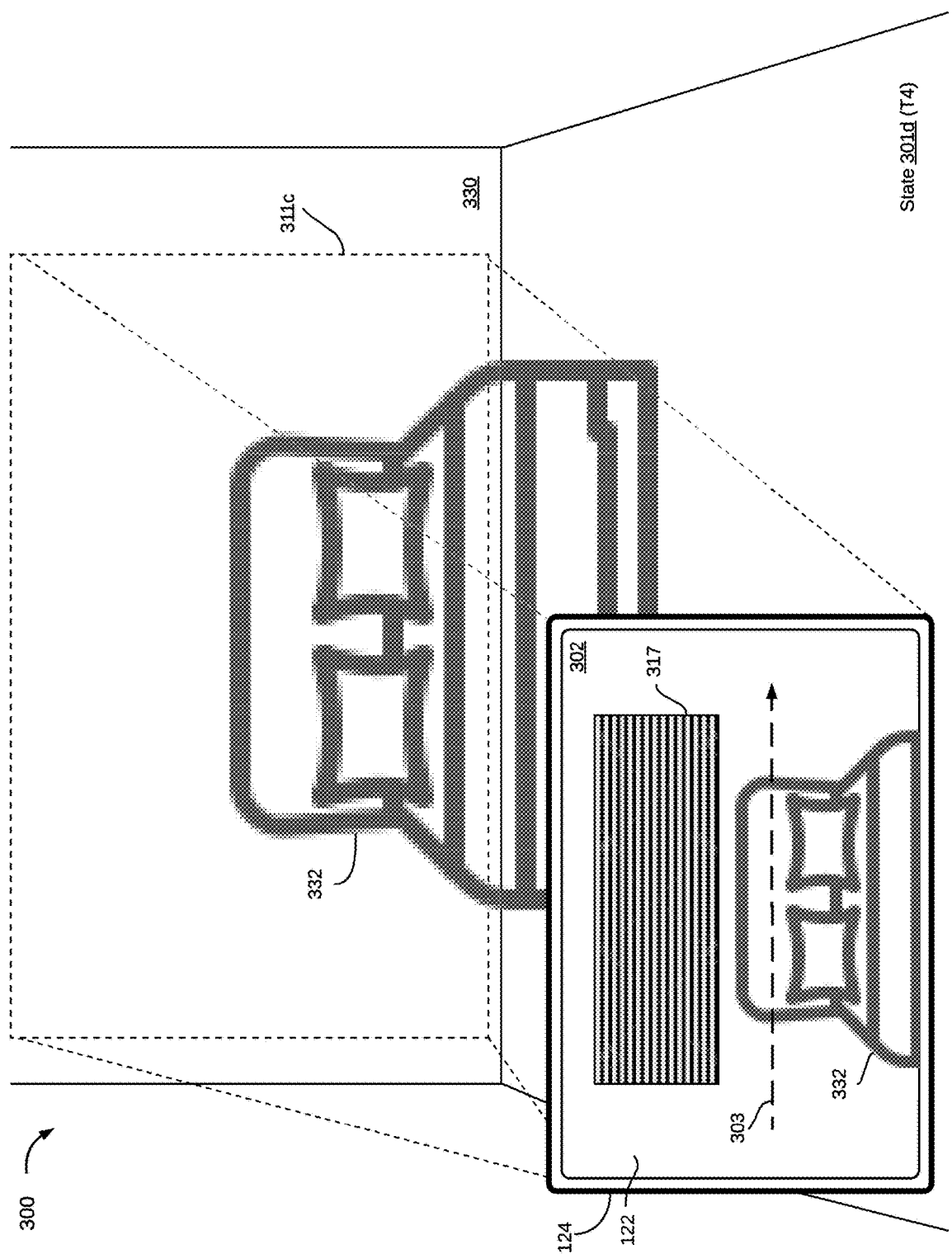

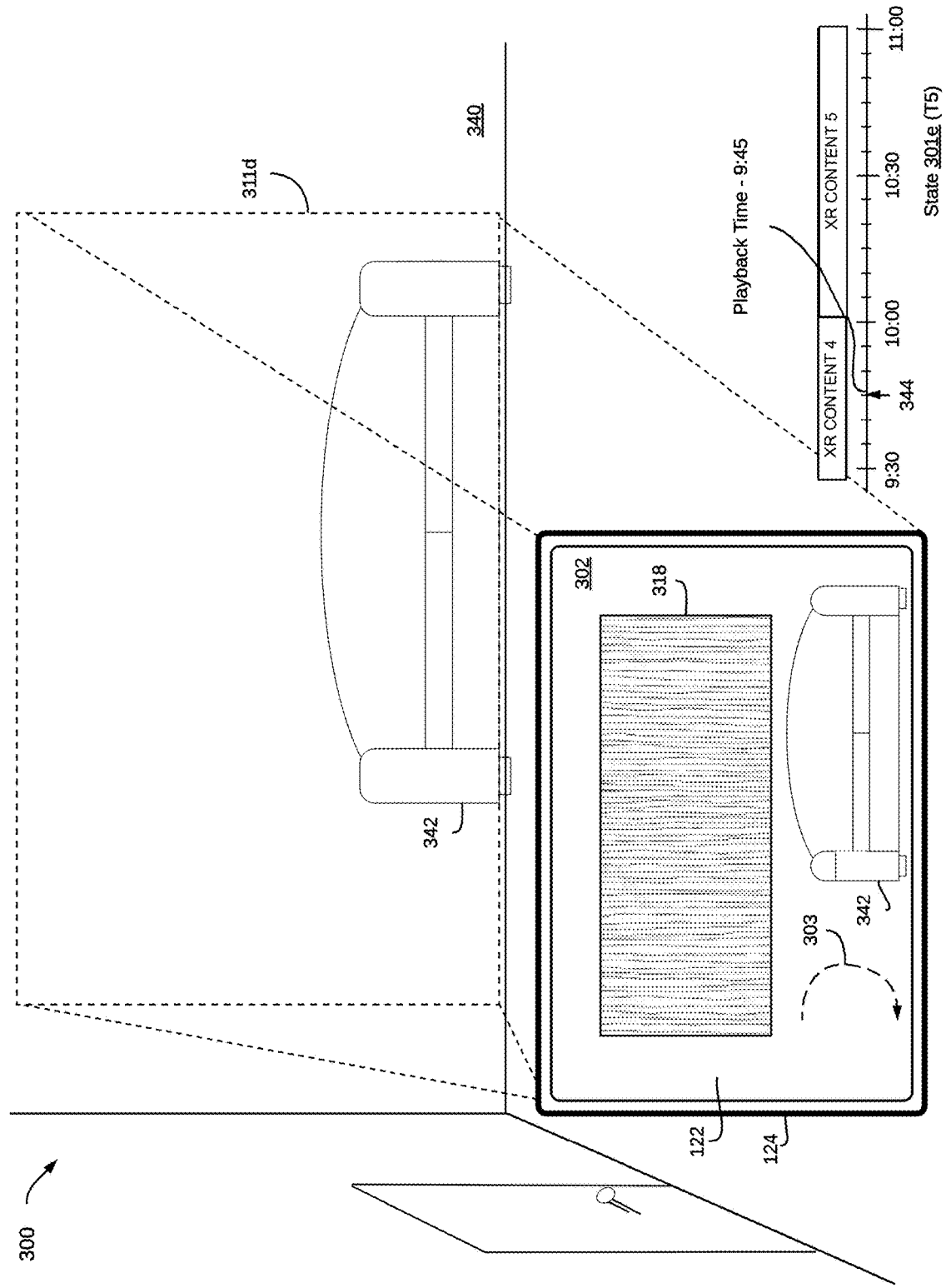

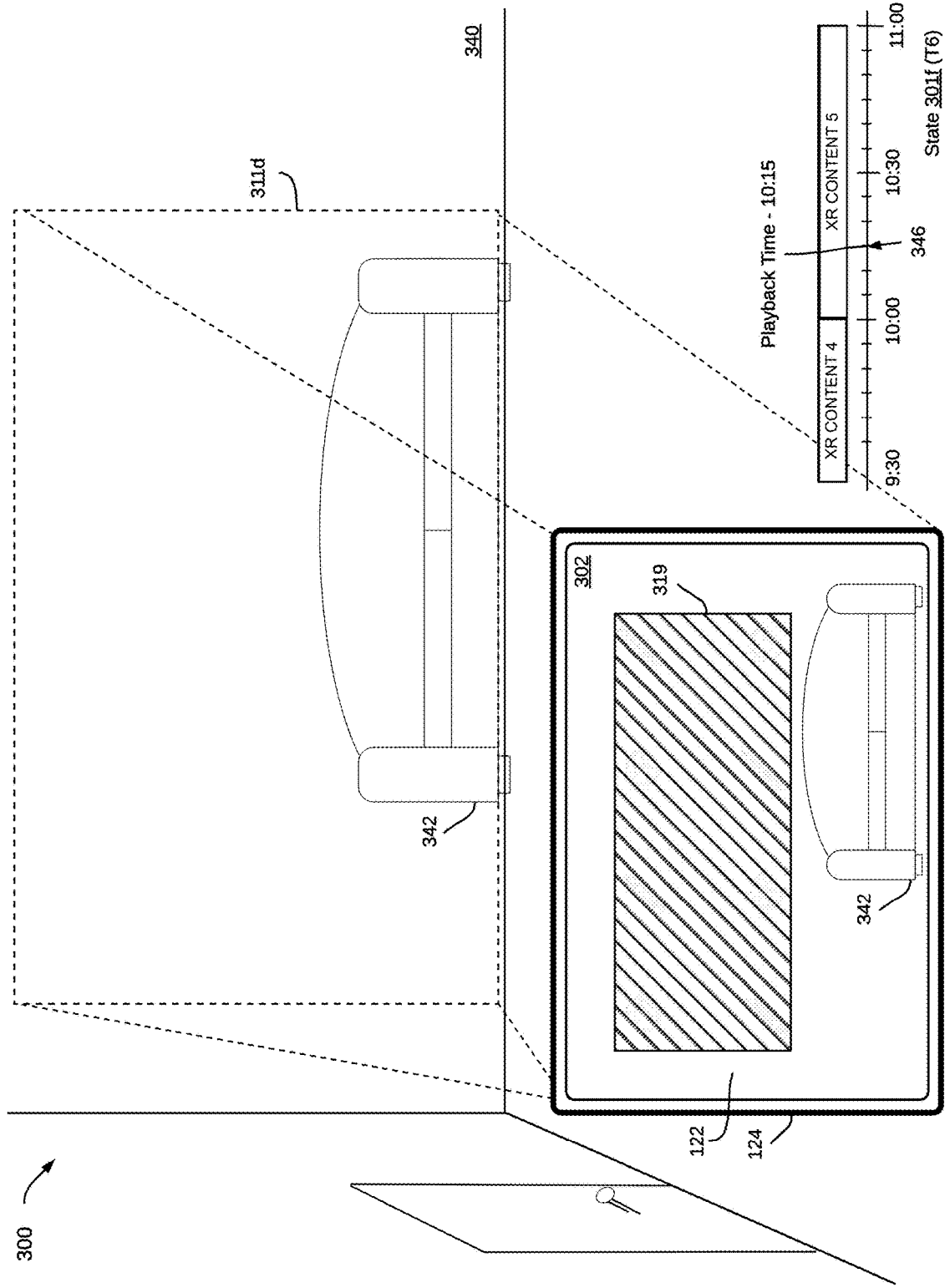

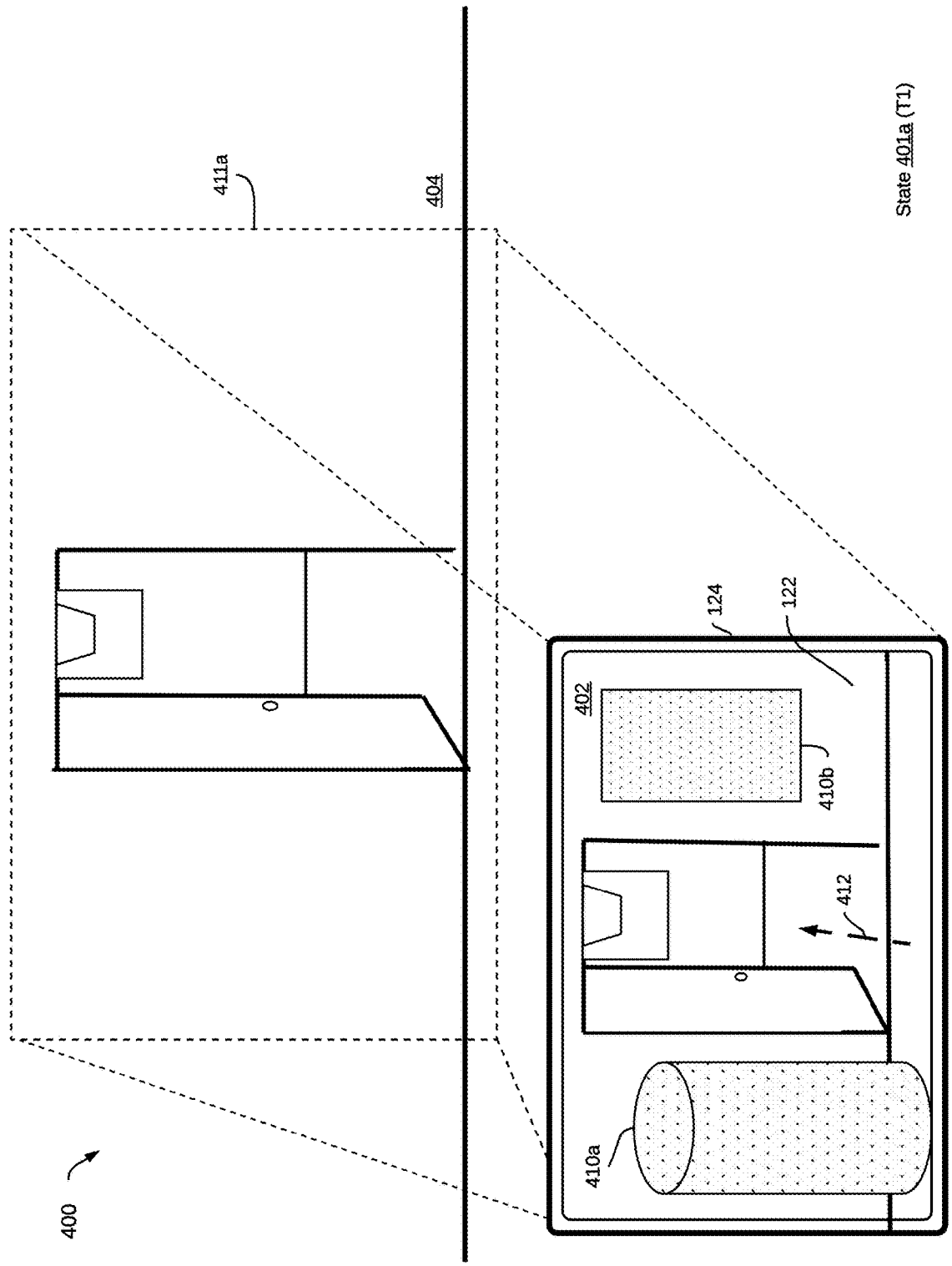

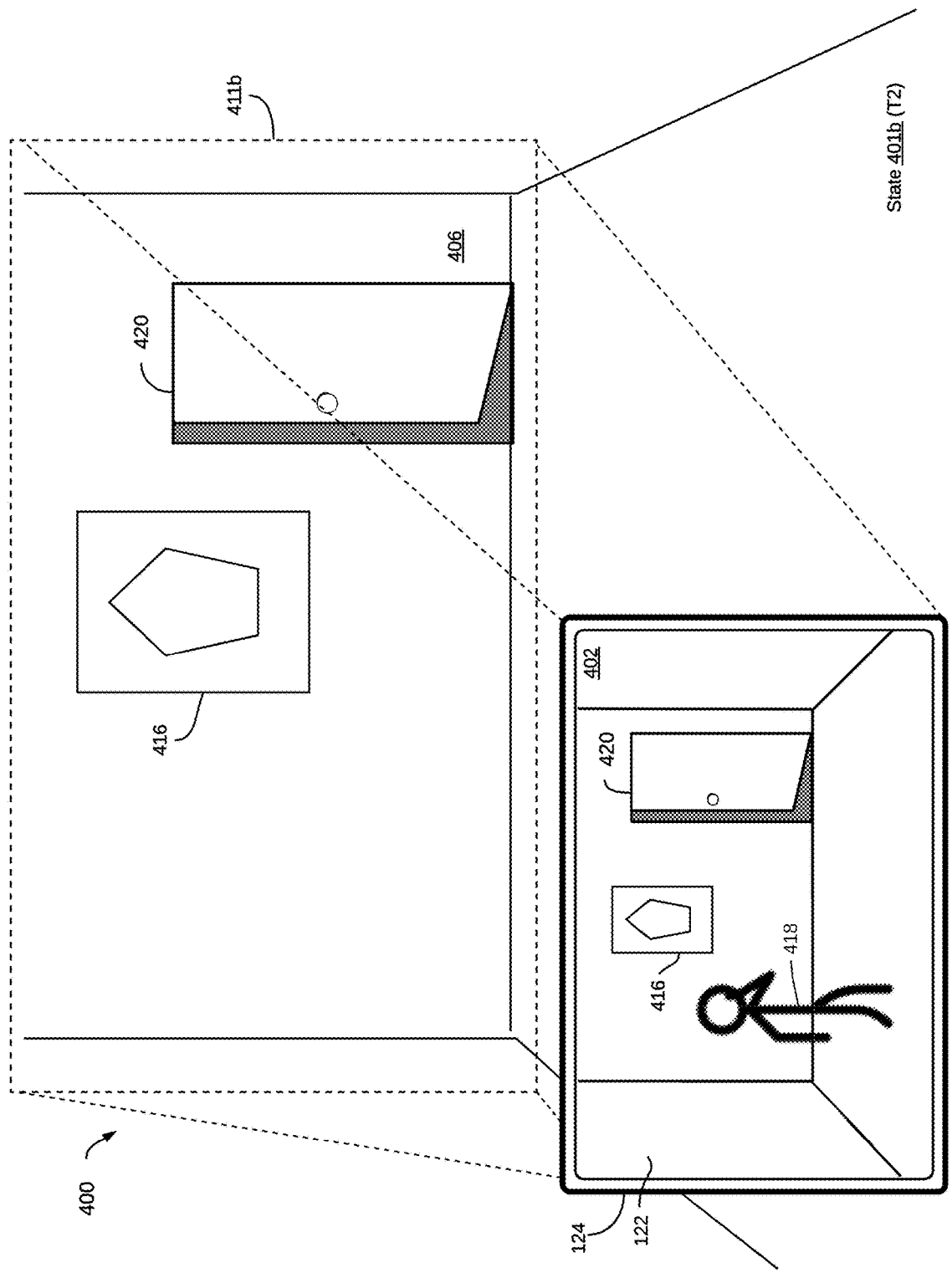

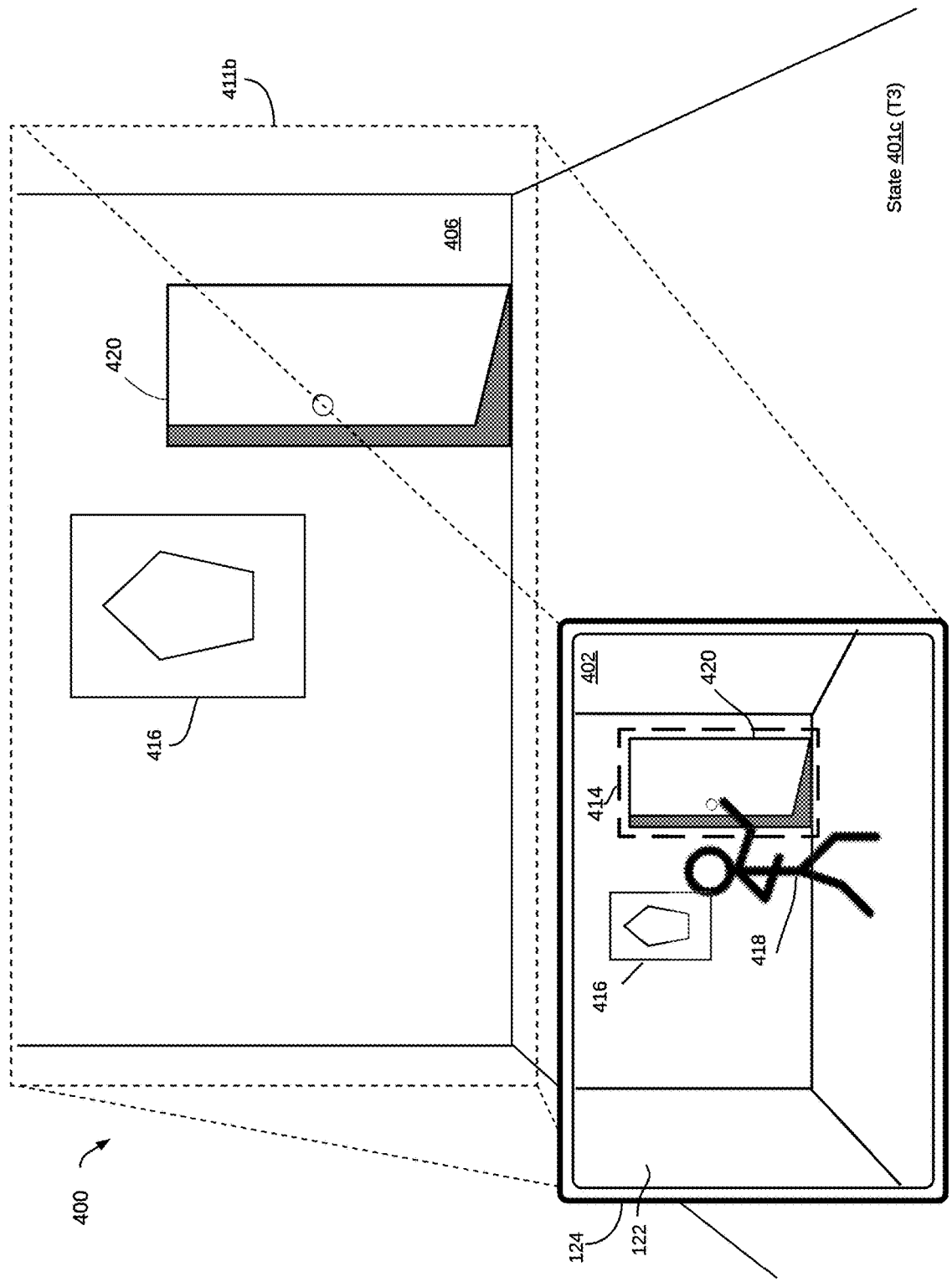

GENERATING ADAPTED VIRTUAL CONTENT TO SPATIAL CHARACTERISTICS OF A PHYSICAL SETTING

CROSS-REFERENCE TO RELATED APPLICATIONS

This application is a continuation of Intl. Patent App. No. PCT/US2020/038398, filed on Jun. 18, 2020, which claims priority to U.S. Provisional Patent App. No. 62/866,122, filed on Jun. 25, 2019, which are both hereby incorporated by reference in their entirety.

TECHNICAL FIELD

The present disclosure generally relates to generating virtual content (sometimes also referred to herein as "extended reality (XR) content") and, in particular, to generating adapted virtual content based on spatial characteristics of a plurality of subsets within a physical environment.

BACKGROUND

In some instances, XR content is created without regard to spatial characteristics (e.g., volumetric space, shape, etc.) of a physical environment (sometimes also referred to herein as a "physical setting" or a "physical scene"). For example, when the physical environment corresponds to a large-sized room with ample space, a user may be presented with XR content and interact with the XR content by walking around the physical environment. However, in another example, when the physical environment corresponds to a small room with limited space, the user is unable to navigate the XR content by traveling through the physical environment in the same way the user is able to travel through the large-sized room.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 3A-3F illustrate an example XR presentation scenario sequence for generating adapted XR content based on spatial characteristics of a plurality of subsets within a physical environment in accordance with some implementations.

FIGS. 4A-4C illustrate another example XR presentation scenario sequence for generating adapted XR content based on spatial characteristics of a plurality of subsets within a physical environment in accordance with some implementations.

Figure 1:
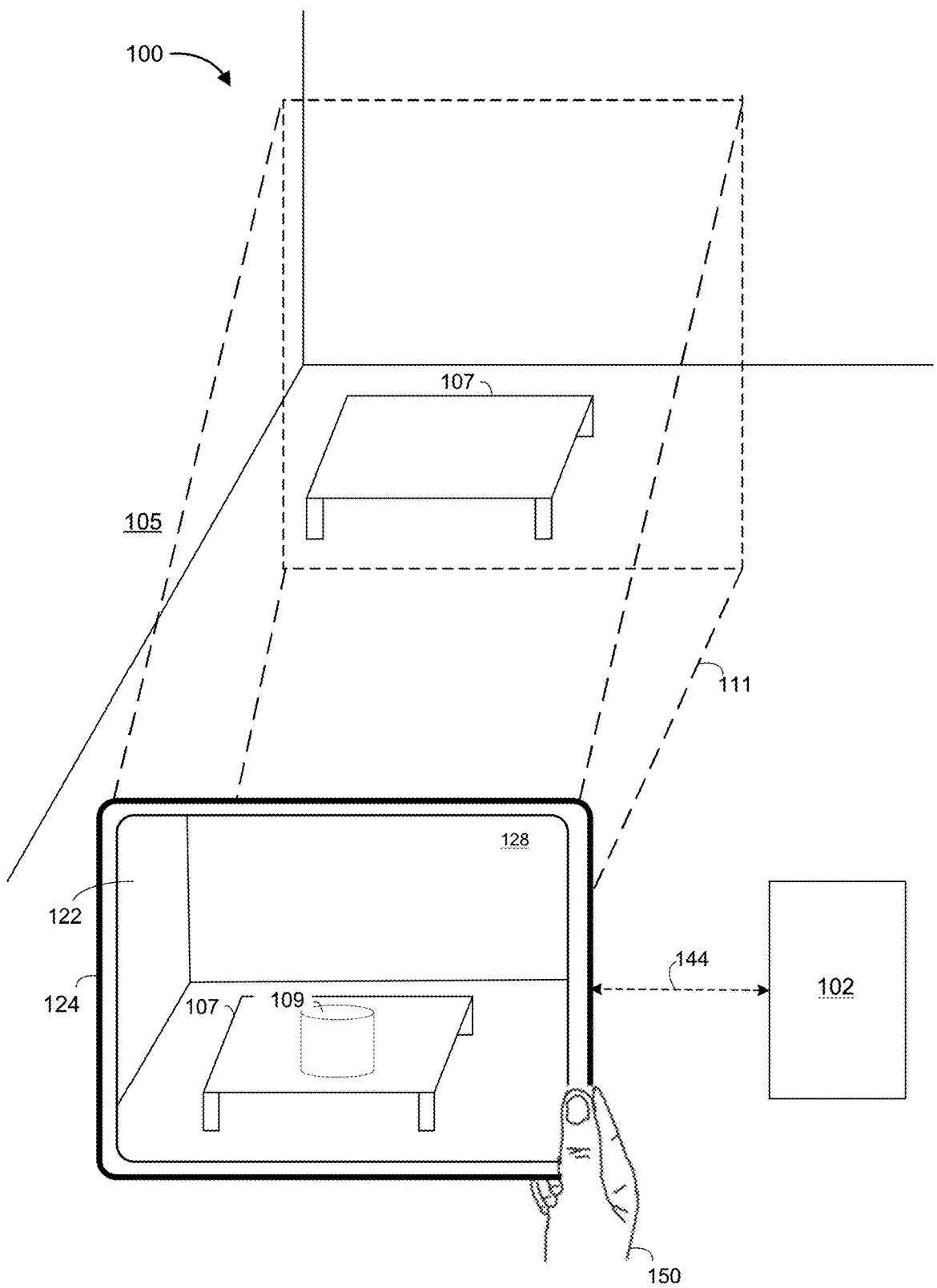
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, system, and methods for generating adapted extended reality (XR) content based on spatial characteristics of a plurality of subsets within a physical environment. In various implementations, the method is performed at an electronic device with an image sensor, one or more processors, a non-transitory memory, and a display. In some implementations, the method is performed at a computing system including non-transitory memory and one or more processors, wherein the computing system is communicatively coupled to a display device, one or more exterior-facing image sensors, and one or more input devices. The method includes: identifying a plurality of subsets associated within a physical environment; determining a set of spatial characteristics for each of the plurality of subsets within the physical environment, wherein a first set of spatial characteristics characterizes one or more dimensions of a first subset of the plurality of subsets, and a second set of spatial characteristics characterizes one or more dimensions of a second subset of the plurality of subsets; generating adapted first XR content portion for the first subset of the plurality of subsets based at least in part on the first set of spatial characteristics; generating adapted second XR content portion for the second subset of the plurality of subsets based at least in part on the second set of spatial characteristics; and generating one or more navigation options that allow a user to traverse between the first and the second subsets of the plurality of subsets based on the first and second sets of spatial characteristics.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein. Various examples of electronic systems and techniques for using such systems in relation to various extended reality technologies are described.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 102 and an electronic device 124.

In some implementations, the controller 102 is configured to manage and coordinate an XR experience (sometimes also referred to herein as a "XR environment" or a "virtual environment" or a "graphical environment") for a user 150 and optionally other users. In some implementations, the controller 102 includes a suitable combination of software, firmware, and/or hardware. The controller 102 is described in greater detail below with respect to FIG. 2. In some implementations, the controller 102 is a computing device that is local or remote relative to the physical environment 105. For example, the controller 102 is a local server located within the physical environment 105. In another example, the controller 102 is a remote server located outside of the physical environment 105 (e.g., a cloud server, central server, etc.). In some implementations, the controller 102 is communicatively coupled with the electronic device 124 via one or more wired or wireless communication channels 144 (e.g., BLUETOOTH, IEEE 802.11x, IEEE 802.16x, IEEE 802.3x, etc.). In some implementations, the functions of the controller 102 are provided by the electronic device 124. As such, in some implementations, the components of the controller 102 are integrated into the electronic device 124.

In some implementations, the electronic device 124 is configured to present audio and/or video (A/V) content to the user 150. In some implementations, the electronic device 124 is configured to present a user interface (UI) and/or an XR environment 128 to the user 150. In some implementations, the electronic device 124 includes a suitable combination of software, firmware, and/or hardware. The electronic device 124 is described in greater detail below with respect to FIG. 3.

According to some implementations, the electronic device 124 presents an XR experience to the user 150 while the user 150 is physically present within a physical environment 105 that includes a table 107 within the field-of-view (FOV) 111 of the electronic device 124. As such, in some implementations, the user 150 holds the electronic device 124 in his/her right hand as shown in FIG. 1. In some implementations, while presenting the XR experience, the electronic device 124 is configured to present XR content (sometimes also referred to herein as "graphical content" or "virtual content"), including an XR cylinder 109, and to enable video pass-through of the physical environment 105 (e.g., including the table 107 or a representation thereof) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 124. As another example, the XR cylinder 109 corresponds to world/object-locked content such that the XR cylinder 109 remains displayed at its origin location as the FOV 111 changes due to translational and/or rotational movement of the electronic device 124. As such, in this example, if the FOV 111 does not include the origin location, the XR environment 128 will not include the XR cylinder 109. For example, the electronic device 124 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 124 corresponds to a pair of glasses worn by the user 150. As such, in some implementations, the electronic device 124 presents a user interface by projecting the XR content (e.g., the XR cylinder 109) onto the additive display, which is, in turn, overlaid on the physical environment 105 from the perspective of the user 150. In some implementations, the electronic device 124 presents the user interface by displaying the XR content (e.g., the XR cylinder 109) on the additive display, which is, in turn, overlaid on the physical environment 105 from the perspective of the user 150.

In some implementations, the user 150 wears the electronic device 124 such as a near-eye system. As such, the electronic device 124 includes one or more displays provided to display the XR content (e.g., a single display or one for each eye). For example, the electronic device 124 encloses the FOV of the user 150. In such implementations, the electronic device 124 presents the XR environment 128 by displaying data corresponding to the XR environment 128 on the one or more displays or by projecting data corresponding to the XR environment 128 onto the retinas of the user 150.

In some implementations, the electronic device 124 includes an integrated display (e.g., a built-in display) that displays the XR environment 128. In some implementations, the electronic device 124 includes a head-mountable enclosure. In various implementations, the head-mountable enclosure includes an attachment region to which another device with a display can be attached. For example, in some implementations, the electronic device 124 can be attached to the head-mountable enclosure. In various implementations, the head-mountable enclosure is shaped to form a receptacle for receiving another device that includes a display (e.g., the electronic device 124). For example, in some implementations, the electronic device 124 slides/snaps into or otherwise attaches to the head-mountable enclosure. In some implementations, the display of the device attached to the head-mountable enclosure presents (e.g., displays) the XR environment 128. In some implementations, the electronic device 124 is replaced with an XR chamber, enclosure, or room configured to present XR content in which the user 150 does not wear the electronic device 124.

In some implementations, the controller 102 and/or the electronic device 124 cause an XR representation of the user 150 to move within the XR environment 128 based on movement information (e.g., body pose data, eye tracking data, hand/limb/finger/extremity tracking data, etc.) from the electronic device 124 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 102 and/or the electronic device 124 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

FIGS. 2A-2D illustrate a comparison between a first XR presentation scenario 200a sequence and a second XR presentation scenario 200b sequence in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

The XR presentation scenario sequences shown in FIGS. 2A-2D depict a comparison between the electronic device 124 and/or the controller (e.g., the controller 102 shown in FIGS. 1 and 6) adapting XR content in a first XR presentation scenario 200a and a second XR presentation scenario 200b. The comparison highlights the similarities and differences between generating adapted XR content based on the spatial characteristics of a first physical environment 202 corresponding to a large empty room and on the spatial characteristics of a second physical environment 204 corresponding to a small room filled with objects.

Figure 2A:
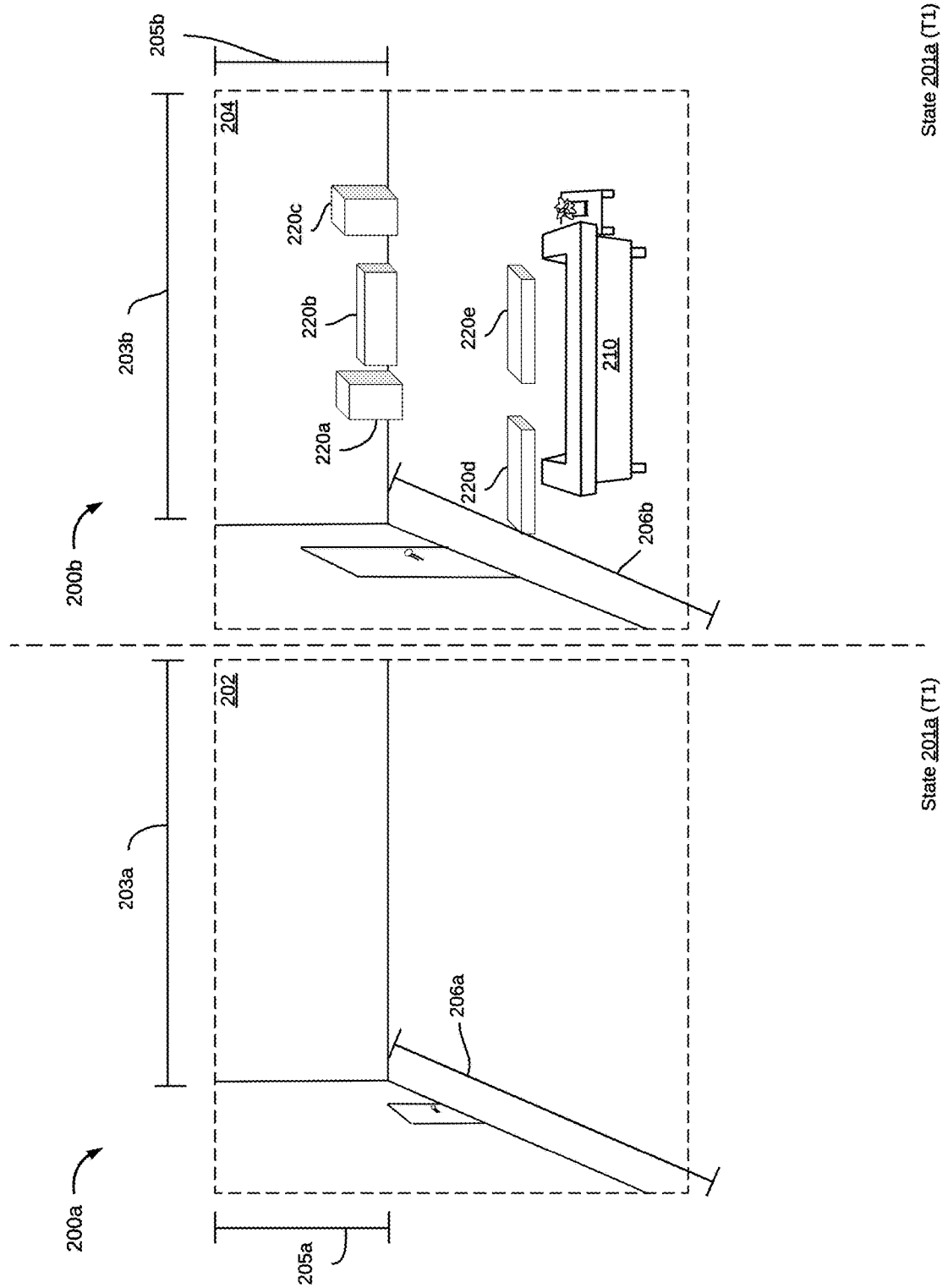
FIGS. 2A-2D illustrate a comparison between a first extended reality (XR) presentation scenario sequence and a second XR presentation scenario sequence in accordance with some implementations.

FIG. 2A illustrates a first state 201a (e.g., associated with T1 or a first time period) of a first XR presentation scenario 200a associated with the first physical environment 202 and a second XR presentation scenario 200b associated with the second physical environment 204. With reference to the first XR presentation scenario 200a in FIG. 2A, the first physical environment 202 includes an empty room with a first x-dimension 203a, a first y-dimension 205a, and a first z-dimension 206a. As shown in the second XR presentation scenario 200b, the second physical environment 204 includes a room with a second x-dimension 203b, a second y-dimension 205b, and a second z-dimension 206b. For example, the second x-dimension 203b, the second y-dimension 205b, and the second z-dimension 206b of the second physical environment 204 are significantly smaller than the first x-dimension 203a, the first y-dimension 205a, and the first z-dimension 206a of the first physical environment 202. Thus, compared to the first physical environment 202, the second physical environment 204 corresponds to a much smaller volumetric size than the first physical environment 202. Furthermore, in contrast to the empty room in the first physical environment 202, the second XR presentation scenario 200b includes physical objects such as chairs 220a, 220c, a credenza 220b, coffee tables 220d, 220e, and a sofa 210 within the second physical environment 204.

In some implementations, where the field-of-view of the user is enclosed, the electronic device 124 is configured to enable video pass-through of the first physical environment 202 on a display 122. In some implementations, the electronic device 124 is also configured to present the first XR presentation scenario 200a on the display 122. In some implementations, the display 122 corresponds to an additive display that enables optical-see through of the first physical environment 202. For example, the display 122 corresponds to a transparent lens and the electronic device 124 corresponds to a pair of glasses worn by the user. In some implementations, the electronic device 124 presents the first XR presentation scenario 200a by projecting adapted XR content on the additive display, which is, in turn overlaid on the first physical environment 202 from the perspective of the user. In some implementations, the electronic device 124 presents the first XR presentation scenario 200a by rendering the adapted XR on the additive display, which is also, in turn overlaid on the first physical environment 202 from the perspective of the user.

In some implementations, where the field-of-view of the user is enclosed, the electronic device 124 is configured to enable video pass-through of the second physical environment 204 including the physical objects on the display 122. In some implementations, the electronic device 124 is also configured to present the second XR presentation scenario 200b on the display 122. In some implementations, the display 122 corresponds to an additive display that enables optical-see through of the second physical environment 204 including the physical objects. For example, the display 122 corresponds to a transparent lens and the electronic device 124 corresponds to a pair of glasses worn by the user. In some implementations, the electronic device 124 presents the second XR presentation scenario 200b by projecting adapted XR content on the additive display, which is, in turn overlaid on the second physical environment 204 from the perspective of the user. In some implementations, the electronic device 124 presents the second XR presentation scenario 200b by rendering the adapted XR on the additive display, which is also, in turn overlaid on the second physical environment 204 from the perspective of the user.

Figure 2B:
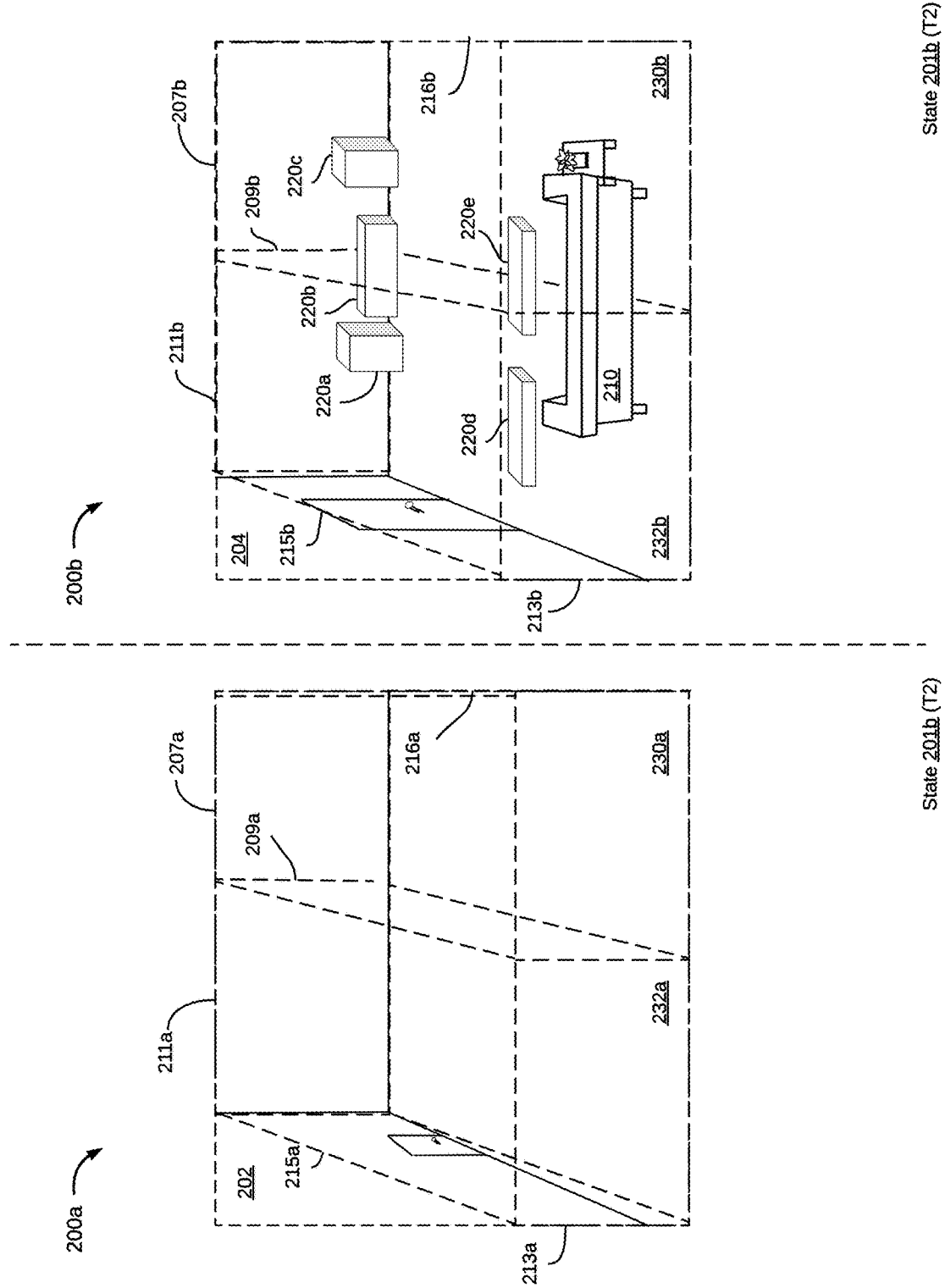

FIG. 2B illustrates a second state 201b (e.g., associated with T2 or a second time period) of the first XR presentation scenario 200a and the second XR presentation scenario 200b. In some implementations, the electronic device 124 and/or the controller identifies a plurality of subsets associated with the physical environment. In some implementations, the electronic device 124 obtains, via an exterior-facing image sensor of the electronic device, image data that corresponds to the physical environment. In turn, the electronic device 124 identifies the plurality of subsets within the physical environment based at least in part on the image data and determines the sets of spatial characteristics for the plurality of subsets based at least in part on the image data and/or depth information. In some implementations, the electronic device 124 obtains depth information, image data, and/or the like from the one or more optional remote input devices.

In some implementations, the electronic device 124 identifies a plurality of subsets of the first physical environment 202 including a first subset 230a and a second subset 232a. In some implementations, the electronic device 124 determines the plurality of subsets based on a metric that is not associated with physical divisions. For example, if a physical environment does not include physical divisions, then the electronic device 124 identifies the plurality of subsets by dividing the physical environment in half and identifying a first half of the physical environment as a first subset and the second half of the physical environment as a second subset. Similarly, as shown in the second XR presentation scenario 200b, the electronic device 124 also identifies a plurality of subsets of the second physical environment 204 as a first subset 230b and a second subset 232b. In some implementations, the electronic device 124 determines the plurality of subsets based on physical division. For example, with reference to FIG. 3A, if the physical environment corresponds to a house 301, then the electronic device 124 identifies the plurality of subsets based on each individual room (e.g., the basement 310, the kitchen 320, the bedroom 330, and the living room 340). As another example, if the physical environment corresponds to a single room, then the electronic device 124 identifies the plurality of subsets based on the different walls of the single room. As yet another example, if the physical environment corresponds to a single room, then the electronic device 124 identifies the plurality of subsets based on the corners of a room.

In some implementations, the electronic device 124 determines a set of spatial characteristics for each of the plurality of subsets within the physical environment. As shown in the first XR presentation scenario 200a, the electronic device 124 determines a first set of spatial characteristics for the first subset 230a including, for example: a volumetric size of the first subset 230a based on an x-dimension 207a, a y-dimension 209a, and a z-dimension 216a; an indication of no physical objects within the first subset 230a; and/or the like. Additionally, the electronic device 124 also determines a second set of spatial characteristics for the second subset 232a including, for example: a volumetric size of the second subset 232a based on an x-dimension 211a, a y-dimension 213a, and a z-dimension 215a; an indication of no physical objects within the first physical environment 202; and/or the like.

Similarly, as shown in the second XR presentation scenario 200b, the electronic device 124 also determines a first set of spatial characteristics for the first subset 230b including, for example: a volumetric size of the first subset 230b based on an x-dimension 207b, a y-dimension 209b, and a z-dimension 216b; an indication of physical objects (e.g., the chair 220c, the credenza 220b, the coffee table 220e, and the sofa 210) within the second physical environment 204; and/or the like. Additionally, the electronic device 124 also determines a second set of spatial characteristics for the second subset 232b including, for example, a volumetric size of the second subset 232b based on an x-dimension 211b, a y-dimension 213b, and a z-dimension 215b; an indication of physical objects (e.g., the chair 220a, the credenza 220b, the coffee tables 220d, 220e, and the sofa 210) within the second physical environment 204 and/or the like. As shown in FIG. 2B, the dimensions of the first subset 230b and the second subset 232b of the second physical environment 204 are much smaller than dimensions of the first subset 230a and second subset 232a of the first physical environment 202.

Figure 2C:
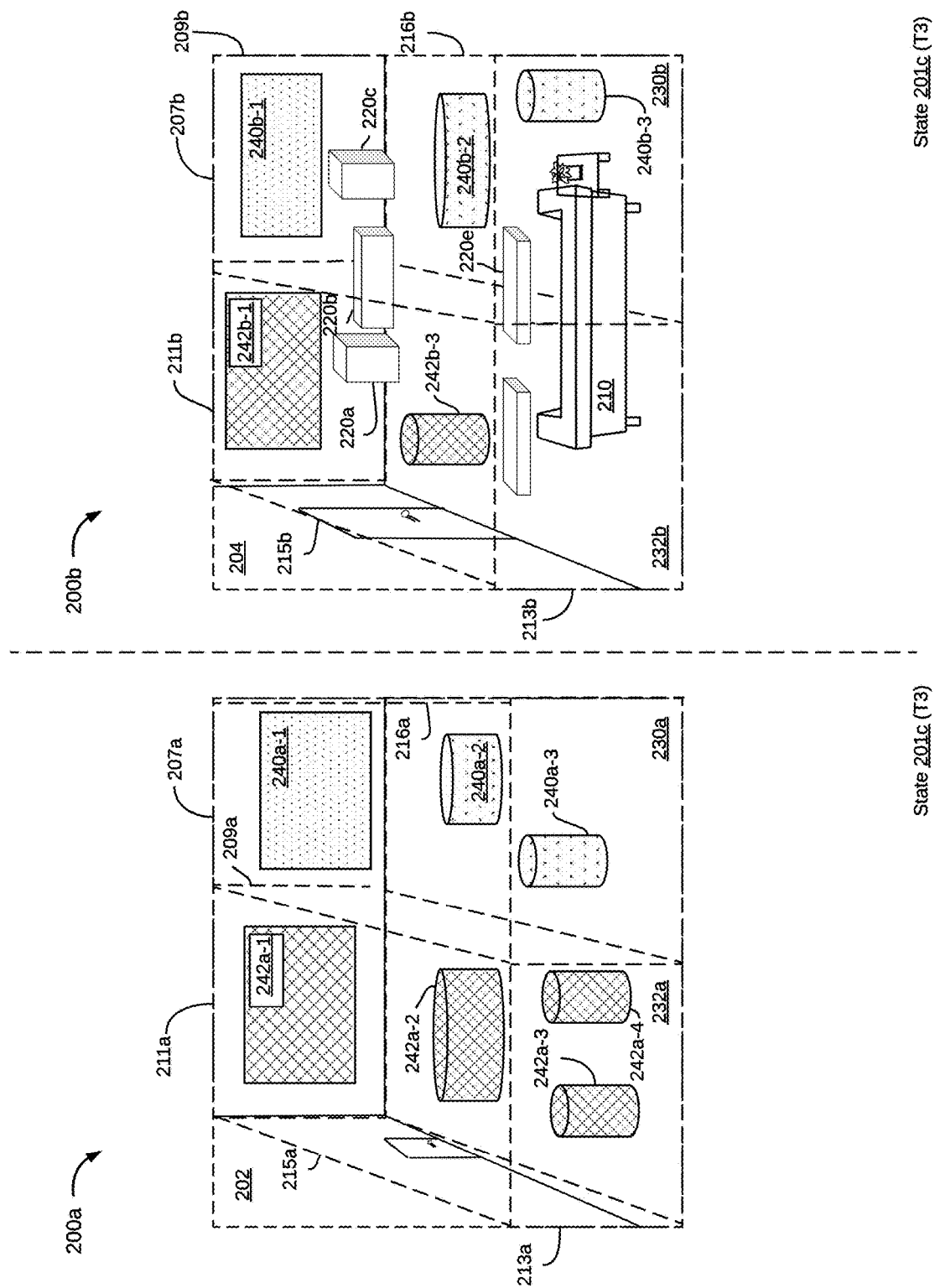

FIG. 2C illustrates a third state 201c (e.g., associated with T3 or a third time period) of the first XR presentation scenario 200a and the second XR presentation scenario 200b. In some implementations, after logically mapping a first XR portion to the first subset 230a, the electronic device 124 and/or the controller 102 generates a first XR content portion adapted from predetermined XR content based at least in part on the first set of spatial characteristics. With reference to the first XR presentation scenario 200a in FIG. 2C, the electronic device 124 generates the adapted first XR content 240a-1, 240a-2, and 240a-3 based on the first set of spatial characteristics for the first subset 230a of the first physical environment 202. As shown in FIG. 2C, the electronic device 124 presents the adapted first XR content 240a-1, 240a-2, and 240a-3 within the first subset 230a of the first physical environment 202.

Similarly, in some implementations, after logically mapping a first XR portion to the first subset 230b, the electronic device 124 and/or the controller 102 generates an adapted first XR content portion by adapting predetermined XR content based on the first set of spatial characteristics. With reference to the second XR presentation scenario 200b in FIG. 2C, the electronic device 124 generates the adapted first XR content 240b-1, 240b-2, and 240b-3 based on the first set of spatial characteristics for the first subset 230b of the second physical environment 204. As shown in FIG. 2C, the electronic device 124 presents the adapted first XR content 240b-1, 240b-2, and 240b-3 within the first subset 230b of the second physical environment 204. However, compared to the first XR presentation scenario 200a, the adapted XR content 240b-1, 240b-2, and 240b-3 in the first subset 230b is scaled down to a smaller size than the adapted XR content 240a-1, 240a-2, 240a-3 in the first subset 230a due to the difference in dimensions between the first subset 230a of the first physical environment 202 and the first subset 230b of the second physical environment 204.

In some implementations, after logically mapping a second XR portion to the second subset 232a, the electronic device 124 and/or the controller 102 generates a second XR content portion by adapting predetermined XR content based on the second set of spatial characteristics. With reference to the first XR presentation scenario 200a in FIG. 2C, the electronic device 124 generates adapted second XR content 242a-1, 242a-2, 242a-3, and 242a-4 based on the second set of spatial characteristics for the second subset 232a of the first physical environment 202. As shown in FIG. 2C, the electronic device 124 presents the adapted second XR content 242a-1, 242a-2, 242a-3, and 242a-4 within the second subset 232ba of the first physical environment 202.

Similarly, in some implementations, after logically mapping a second XR portion to the second subset 232b, the electronic device 124 and/or the controller 102 generates a second XR content portion by adapting the predetermined XR content based on the second set of spatial characteristics. With reference to the second XR presentation scenario 200b in FIG. 2C, the electronic device 124 generates the adapted second XR content 242b-1 and 242b-3 based on the second set of spatial characteristics for the second subset 232b of the second physical environment 204. As shown in FIG. 2C, the electronic device 124 presents the adapted 242b-1 and 242b-3 within the second subset 232b of the second physical environment 204. However, compared to the first XR presentation scenario 200a, the electronic device 124 removes corresponding adapted XR content 242a-2 and 242a-4 (e.g., shown in the second subset 232b of the first physical environment 202) when generating the adapted second XR content in the second subset 232b due to the volumetric size of the second subset 232b and the indication of objects (e.g., the sofa 210, the chair 220a, and the coffee table 220d) within the second subset 232b of the second physical environment 204. Furthermore, compared to the first XR presentation scenario 200a, the adapted XR content 242b-1 and 242b-3 in the second subset 232b is also scaled down to a smaller size than the adapted XR content 242a-1 and 242a-3 in the second subset 232a due to the difference in dimensions between the second subset 232a of the first physical environment 202 and the second subset 232b of the second physical environment 204. Accordingly, in the second XR presentation scenario 200b, the electronic device 124 presents both a smaller scaled-down version of second XR content 242b-1 and 242b-3 in the second subset 232b and foregoes presenting a version of the adapted XR content 242a-2 and 242a-4 in the second subset 232b.

Figure 2D:
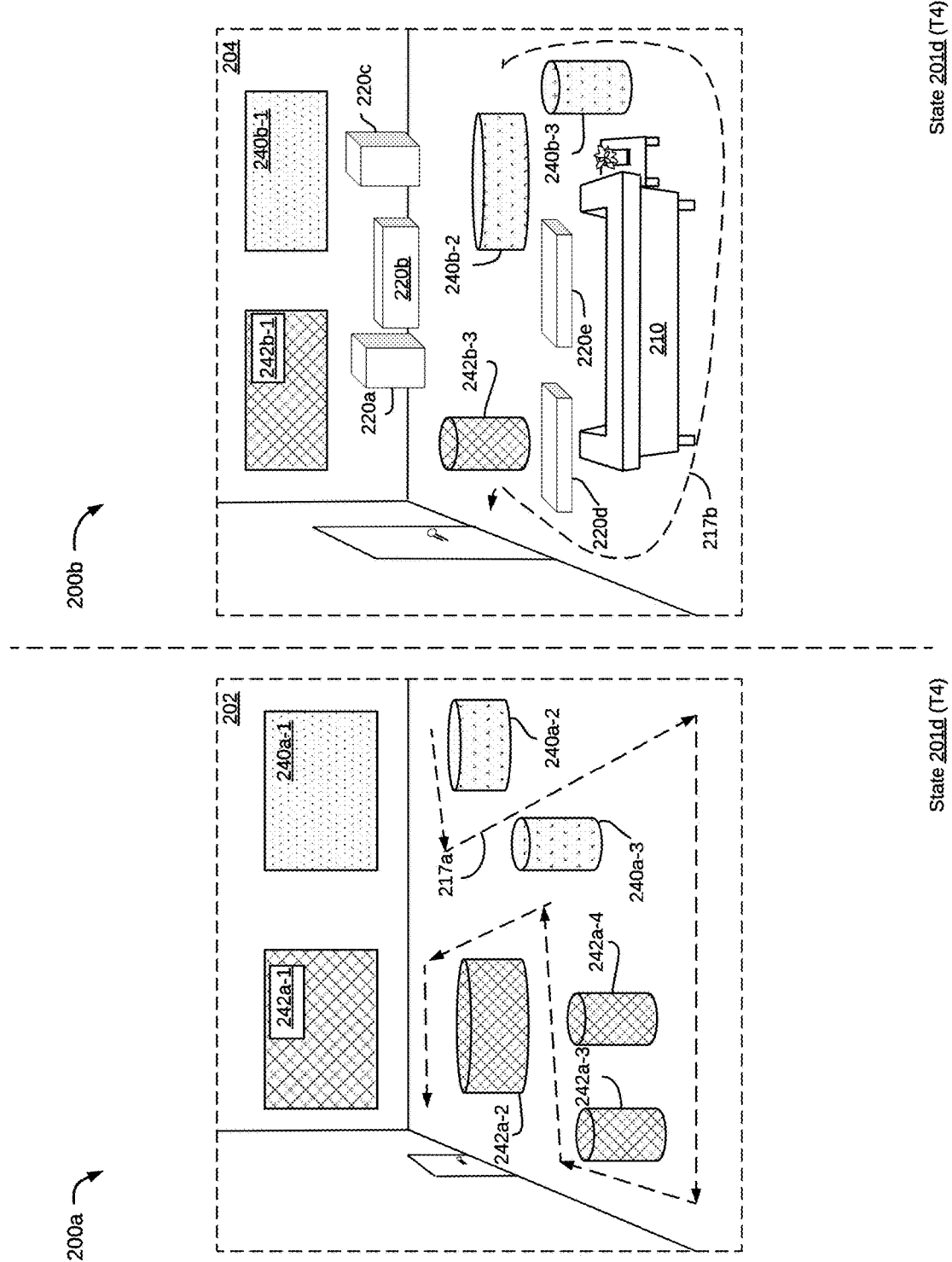

FIG. 2D illustrates a fourth state 201d (e.g., associated with T4 or a fourth time period) of the first example XR presentation scenario 200a and the second XR presentation scenario 200b. In some implementations, the electronic device 124 and/or the controller generates one or more navigation options that allow a user to traverse between the first and the second subsets based on the first and second sets of spatial characteristics.

With reference to the first XR presentation scenario 200a in FIG. 2D, the electronic device 124 generates a navigation option that includes a first navigation path 217a in order to allow the user 10 to traverse between the first subset 230a (not shown) and the second subset 232a (not shown) of the first physical environment 202. In some implementations, the user 10 navigates between the first and second subsets by physically walking from the first subset 230a to the second subset 232a along the first navigation path 217a. The electronic device 124 determines that the first navigation path 217a corresponds to a long-winding path due to the ample space and lack of objects in the first physical environment 202. As shown in FIG. 2D, the first navigation path 217a weaves between first adapted XR content 240a-1, 240a-2, and 240a-3 in the first subset 230a and between second adapted XR content 242a-4, 242a-3, 242a-2, and 242a-1 in the second subset 232a.

With reference to the second XR presentation scenario 200b in FIG. 2D, the electronic device 124 generates a navigation option that includes a second navigation path 217b in order to allow the user 10 to traverse between the first subset 230b (not shown) and the second subset 232b (not shown) of the second physical environment 204. However, in contrast to the first XR presentation scenario 200a, the electronic device 124 determines that the second navigation path 217b corresponds to a shorter circular navigation path rather than the long-winding path due to the smaller dimensions of the second physical environment 204 and the indication of objects (e.g., chairs 220a, 220c, credenza 220b, coffee tables 220d, 220e, and a sofa 210) within the second physical environment 204. As shown in FIG. 2D, the second navigation path 217b circles around the adapted first XR content 240b-1, 240b-2, and 240b-3 in the first subset 230b and the adapted second XR content 242b-1, 242b-3 in the second subset 232b.

FIGS. 3A-3F illustrate an example XR presentation scenario 300 sequence for generating adapted XR content based on spatial characteristics of a plurality of subsets within a physical environment in accordance with some implementations. While pertinent features are shown, those of ordinary skill in art will appreciate from the present disclosure that various other features have not been illustrated for the sake of brevity and so as not to obscure more pertinent aspects of the example implementations disclosed herein. The sequence shown in FIGS. 3A-3F depicts the electronic device 124 generating adapted XR content associated with a temporally linear plot based on a set of spatial characteristics for each room within a house 301.

Figure 3A:
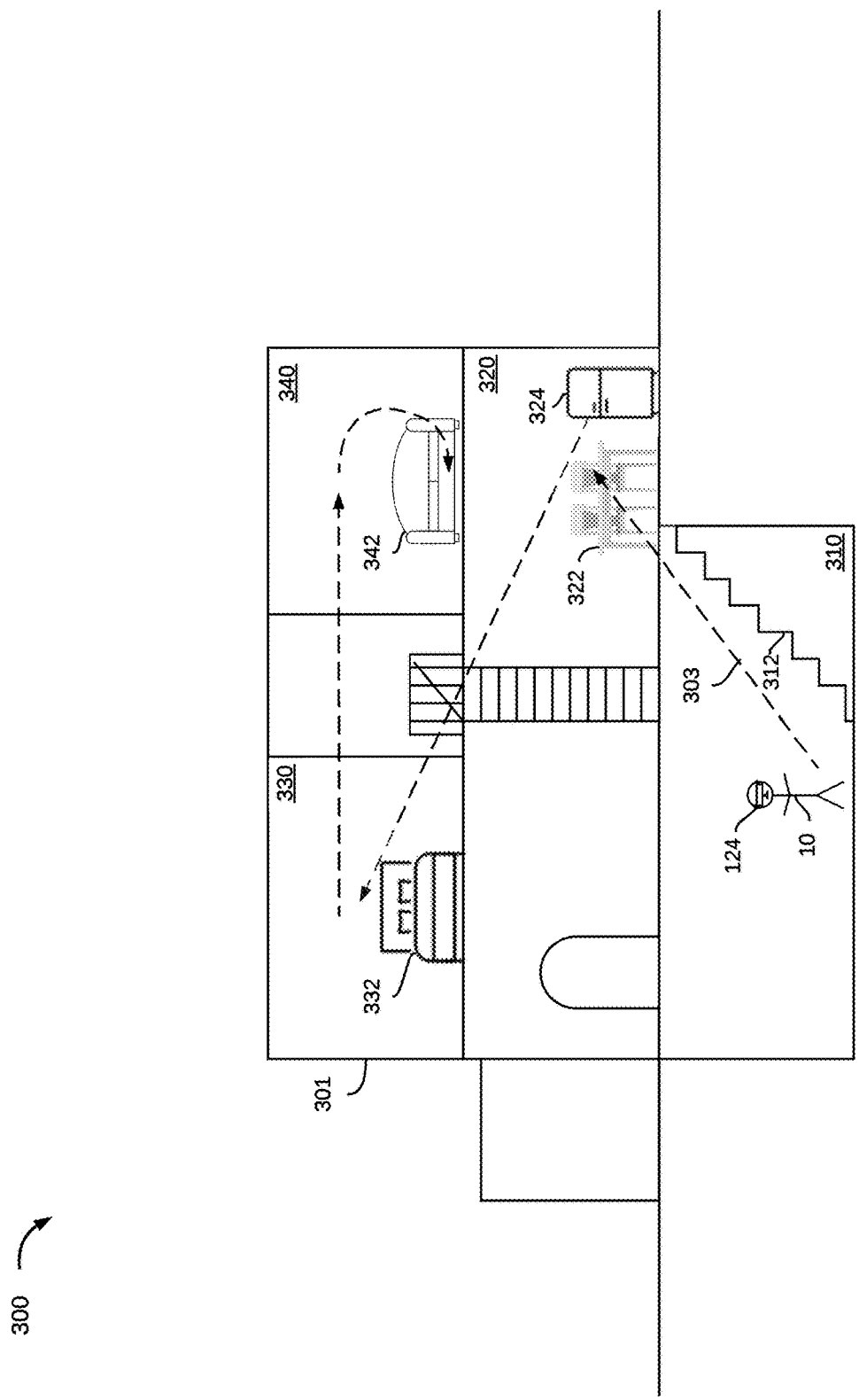

FIG. 3A illustrates a first state 301a (e.g., associated with T1 or a first time period) of the XR presentation scenario 300. However, before the first state 301a, the electronic device 124 obtains, via the exterior-facing image sensor of the electronic device 124, image data that corresponds to the house 301 in order to identify a plurality of subsets (e.g., rooms) within the house 301 and determine the sets of spatial characteristics for the plurality of subsets based at least in part on the image data. In some implementations, the electronic device 124 uses sensor information from one or more remote input devices (e.g., the optional remote input devices) within each room in order to collect/capture input data with informed user consent and provide the input data to the electronic device 124 and/or the controller 102. In some implementations, the electronic device 124 may extract sets of spatial characteristics for a plurality of subsets based at least in part on obtaining data from depth sensors associated with the electronic device 124. In some implementations, the electronic device 124 and/or the controller 102 obtains a set of known spatial characteristics for the plurality of subsets from an external database or library. Those of ordinary skill in the art will appreciate that there are many methods of obtaining image data that corresponds to the physical environment or obtaining a set of known spatial characteristics from an external database. For the sake of brevity, an exhaustive listing of all such methods is not provided therein.

In some implementations, a first XR content portion corresponds to a first thematic scene within predetermined content, and a second XR content portion corresponds to a second thematic scene within the predetermined content. In some implementations, the predetermined content corresponds to XR content associated with a real-life event, story, movie, TV episode, or the like. For example, as shown in FIGS. 3A-3F, the XR content portions are associated with thematic scenes within the predetermined content corresponding to a story with five parts. Therefore, the predetermined content is divided into five XR content portions that are linked together and presented to the user 10 in a temporally ordered sequence in order to deliver a linear story to the user 10. As such, in FIGS. 3A-3F, the predetermined content corresponds to a temporally linear plot with a beginning, a rising action, a climax, a falling action, and a resolution. To that end, the electronic device 124 presents an adapted first XR content (e.g., the beginning) before presenting an adapted second XR content portion (e.g., the rising action) before presenting an adapted third XR content portion (e.g., the climax) and so forth.

As shown in FIG. 3A, the house 301 includes at least a basement 310, a kitchen 320, a bedroom 330, and a living room 340. In the first state 301a, the user 10 wearing the electronic device 124 is located in the basement 310. As mentioned earlier, prior to time T1 in FIG. 3A, the electronic device 124 identifies each room as a subset of the house 301. In addition, the electronic device 124 also obtains XR content portions from the predetermined content to present to the user 10 within a user interface of the electronic device 124. In some implementations, the electronic device 124 obtains the predetermined content from an XR library or database.

In some implementations, the electronic device 124 may determine that a particular XR content portion should be presented in a particular room of the house 301 based on the set of spatial characteristics characterizing one or more dimensions of the particular room. As an example, the first XR content portion may be better suited for large rooms because the first XR content portion includes the most XR content as compared to the other XR content portions. In turn, the electronic device 124 logically maps the first XR content portion to the basement 310 rather than the other rooms in the house 301 because the basement 310 has the largest volumetric size among the rooms within the house 301. As another example, the second XR content portion may be better suited for the smallest room in the house 301 because the second XR content portion includes less XR content as compared to the other XR content portions. As a result, the electronic device 124 logically maps the second XR content portion to the kitchen 320 because the kitchen 320 is the smallest room in the house 301.

In some implementations, after the electronic device 124 logically maps the XR content portions to the plurality of subsets, the electronic device 124 generates one or more navigation options that allow the user 10 to traverse between the subsets (e.g., the basement 310, the kitchen 320, the bedroom 330, and the living room 340) of the house 301 in an ordered sequence. In some implementations, the user 10 navigates between the subsets by physically walking between rooms of the house 301. To that end, the electronic device 124 determines a navigation path 303 that links the rooms with XR content portions to be presented to the user 10 in a temporally ordered sequence (e.g., the adapted first XR content portion 314 is presented before the adapted second XR content portion 316 and so on). In the example of FIGS. 3A-3F, the electronic device 124 determines that the five XR content portions should be presented in a manner such that the user traverses from the bottom of the house 301 to the second story of the house 301 along the navigation path 303. As will be explained in more detail below in FIGS. 3E and 3F, since there are five XR content portions from the predetermined content to present to the user, but only four subsets associated with the house 301, the electronic device 124 presents the adapted fourth XR content portion 318 and the adapted fifth XR content portion 319 in the living room 340. Thus, the electronic device 124 begins the story by presenting the adapted first XR content portion (e.g., the beginning) to the user 10 in the basement 310 and completes the story by presenting the adapted fifth XR content portion (e.g., the resolution) to the user in the living room 340.

FIG. 3B illustrates a second state 301b (e.g., associated with T2 or a second time period) of the XR presentation scenario 300. In the second state 301b, at least a portion of the basement 310 is within a field-of-view 311a of the electronic device 124. As shown in FIG. 3B, the basement 310 includes a set of stairs. In other words, while holding or wearing the electronic device 124, the user is looking at the set of stairs 312 from a side or perspective orientation through the electronic device 124. In some implementations, after logically mapping the first XR content portion to the basement 310, the electronic device 124 generates an adapted first XR content portion 314 based at least in part on the first set of spatial characteristics of the basement 310. As shown in FIG. 3B, in response to determining that the first presentation criterion is satisfied, the electronic device 124 presents, on the display 122, a user interface 302 including the set of stairs 312, the navigation path 303 (optional), and the adapted first XR content portion 314. Here, the first presentation criterion may correspond to the location of the electronic device 124. At time T3 shown in FIG. 3C, the electronic device 124 moves to the second subset (e.g., the kitchen 320) by following the navigation path 303 in order to satisfy a second presentation criterion (e.g., a location of the electronic device 124) for displaying the adapted second XR content portion 316.

FIG. 3C illustrates a third state 301c (e.g., associated with T3 or a third time period) of the XR presentation scenario 300. In comparison to FIG. 3B, the field-of-view of the electronic device 124 changes due to translational movement of the electronic device 124 from the basement 310 (e.g., the first subset of the house 301) to the kitchen 320 (e.g., second subset of the house 301). As shown in FIG. 3C, in the third state 301c, a field-of-view 311b of the electronic device 124 of the kitchen 320 includes a partial view of the dining table 322 and a refrigerator 324. In some implementations, after logically mapping the second XR content portion to the kitchen 320, the electronic device 124 generates an adapted second XR content portion 316 based at least in part on the second set of spatial characteristics of the kitchen 320. As shown in FIG. 3C, in response to determining that the second presentation criterion is satisfied, the electronic device 124 presents, on the display 122, the user interface 302 including a partial view of the dining table 322, the refrigerator 324, the navigation path 303 (optional), and the adapted second XR content portion 316. At time T4 shown in FIG. 3D, the electronic device 124 moves to the third subset (e.g., the bedroom 330) by following the navigation path 303 in order to satisfy a third presentation criterion for displaying the adapted third XR content portion 317.

FIG. 3D illustrates a fourth state 301d (e.g., associated with T4 or a fourth time period) of the XR presentation scenario 300. In comparison to FIG. 3C, the field-of-view of the electronic device 124 changes due to translational movement of the electronic device 124 from the kitchen 320 (e.g., the second subset of the house 301) to the bedroom 330 (e.g., the third subset of the house 301). As shown in FIG. 3D, in the fourth state 301d, a field-of-view 311c of the electronic device 124 of the bedroom 330 includes a partial view of a bed 332. In some implementations, after logically mapping the third XR content portion to the bedroom 330, the electronic device 124 generates an adapted third XR content portion 317 based at least in part on the third set of spatial characteristics of the bedroom 330. As shown in FIG. 3D, in response to the determining that the third presentation criterion is satisfied, the electronic device 124 presents, on the display 122, the user interface 302 including the partial view of the bed 332, the navigation path 303 (optional), and the adapted third XR content portion 317. At time T5 shown in FIG. 3E, the electronic device 124 moves to the fourth subset (e.g., the living room 340) by following the navigation path 303 in order to satisfy the fourth presentation criterion for displaying the adapted fourth XR content portion 318.

FIG. 3E illustrates a fifth state 301e (e.g., associated with T5 or a fifth time period) of the XR presentation scenario 300. In comparison to FIG. 3D, the field-of-view of the electronic device 124 changes due to translational movement of the electronic device 124 from the bedroom 330 (e.g., the third subset of the house 301) to the living room 340 (e.g., the fourth subset of the house 301) associated with the house 301. As shown in FIG. 3E, in the fifth state 301e, a field-of-view 311d of the electronic device 124 includes a sofa 342. In some implementations, after logically mapping the fourth XR content portion to the living room 340, the electronic device 124 generates an adapted fourth XR content portion 318 based at least in part on the fourth set of spatial characteristics of the living room 340. As shown in FIG. 3E, in response to determining that the fourth presentation criterion is satisfied, the electronic device 124 presents, on the display 122, the user interface 302 including the sofa 342, the navigation path 303 (optional), and the adapted fourth XR content portion 318 for a temporal parameter.

In contrast to the first, second, and third presentation criteria in FIGS. 3B-3D, the fourth presentation criteria and the fifth presentation criterion correspond to a temporal criterion associated with predetermined content and a coordinate-based or location-based criterion. The temporal criterion is associated with the adapted fourth and fifth XR content portions 318, 319 because the electronic device 124 presents both the adapted fourth XR content portion 318 and the adapted fifth XR content portion 319 in the fourth subset (e.g., the living room 340). As such, the electronic device 124 presents the adapted fourth XR content portion 318 based at least in part on a temporal criterion (e.g., a playback time "9:30" to "10:00") before presenting the adapted fifth XR content portion 319. In this example, provided for reference, the XR presentation scenario 300 depicts a playback time 344 of "9:45" and the electronic device 124 presents the adapted fourth XR content portion 318 until "10:00." In some implementations, the user 10 may navigate between different XR content portions in the same subset based at least in part on a physical motion such as turning his or her head toward a specific area within the physical environment.

FIG. 3F illustrates a sixth state 301f (e.g., associated with T6 or a sixth time period) of the XR presentation scenario 300. In comparison to FIGS. 3A-3D, the field-of-view 311d of the electronic device 124 shown in FIG. 3F is the same as in FIG. 3E due to the electronic device 124 being stationary. However, in contrast to FIG. 3E, at time T6 in FIG. 3F, time elapses such that the playback time 346 is now "10:15." In some implementations, after logically mapping the fifth XR content portion to the living room 340, the electronic device 124 generates an adapted fifth XR content portion 319 based at least in part on the fifth set of spatial characteristics of the living room 340. Accordingly, at time T6 in FIG. 3F, the fifth presentation criterion is satisfied because the adapted fourth XR content portion 318 surpasses its temporal time limit. As shown at time T6 in FIG. 3F, in response to determining that the fifth presentation criterion (e.g., the temporal criterion) is satisfied, the electronic device 124 presents, on the display 122, the user interface 302 including the sofa 342 and the adapted fifth XR content portion 319.

In some implementations, the predetermined content may be non-linear such that it does not matter what order the electronic device 124 presents the XR content portions from the predetermined content. In some implementations, the electronic device 124 obtains a first set of environmental characteristics associated with the first subset and a second set of environmental characteristics associated with the second subset, wherein generating the adapted first XR content portion includes logically mapping the first XR content portion to the first subset based at least in part on the first set of spatial characteristics of the first subset and the first set of environmental characteristics associated with the first subset and generating the adapted second XR content portion includes logically mapping the second XR content portion to the second subset based at least in part on the second set of spatial characteristics of the second subset and the second set of environmental characteristics associated with the second subset. In some implementations, adapting the XR content portions may be based on environmental characteristics such as a type of room, temperature information, lighting information, objects within the physical environment, a time of day, background color of the physical environment, and/or the like. Those of ordinary skill in the art will appreciate that there are many different types of environmental characteristics. For the sake of brevity, an exhaustive listing of all such types is not provided herein.

As a non-limiting example, the electronic device 124 may be configured to present portions of predetermined content corresponding to different ecosystems based on the environmental characteristics of the subset associated with the physical environment. Continuing with the previous non-limiting example, a first portion of predetermined content may correspond to XR content associated with a subterranean ecosystem, a second portion of predetermined content may correspond to XR content associated with a grassland ecosystem, a third portion of predetermined content may correspond to XR content associated with a forest ecosystem, and a fourth portion of predetermined content may correspond to XR content associated with a desert ecosystem.

With reference to FIG. 3A, for example, the electronic device 124 obtains environmental characteristics associated with the different rooms within the house 301 in order to determine which rooms satisfy the mapping criteria for the portions of predetermined content. For example, the first portion of the predetermined content associated with the subterranean ecosystem includes a set of mapping criteria for a subset that is located underground, having the coolest temperature conditions in the plurality of subsets, and the darkest lighting conditions in the plurality of subsets and first location-based presentation criterion corresponding to a location of the electronic device 124. As such, the electronic device 124 logically maps the first portion of predetermined content associated with the subterranean ecosystem to the basement 310 because the basement 310 satisfies the set of mapping criteria of being located underground and having the coolest temperature and the darkest lighting conditions compared to the rest of the rooms in the house 301.

As another example, the second portion of the predetermined content associated with the grassland ecosystem includes a set of mapping criteria for a subset that has hot temperature conditions and has the brightest lighting conditions in the plurality of subsets and a second location-based presentation criterion corresponding to the location of the electronic device 124. As such, the electronic device 124 logically maps the second portion of the predetermined content associated with the grassland ecosystem to the kitchen 320 because the kitchen 320 satisfies the set of mapping criteria of having the brightest lighting condition compared to the rest of the rooms in the house 301.

As yet another example, the third portion of the predetermined content associated with the forest ecosystem includes a set of mapping criteria for a subset that is located on a second floor and a third location-based presentation criterion corresponding to the location of the electronic device 124. As such, the electronic device 124 logically maps the third portion of the predetermined content associated with the forest ecosystem to the bedroom 330 because the bedroom 330 satisfies the mapping criterion of being located on the second story of the house 301.

As another example, the fourth portion of the predetermined content associated with the desert ecosystem includes a set of mapping criteria for a subset that has the hottest temperature in the plurality of subsets and a fourth location-based presentation criterion corresponding to the location of the electronic device 124. As such, the electronic device 124 logically maps the fourth portion of the predetermined content associated with the desert ecosystem to the living room 340 because the living room 340 has the hottest temperature compared to the rest of the rooms in the house 301.

Continuing with the above example, at time T2 shown in FIG. 3B, the electronic device 124 is located in the basement. As such, in response to determining that the electronic device 124 satisfies the first location-based presentation criterion, the electronic device 124 displays the adapted first portion of the predetermined content associated with the subterranean ecosystem overlaid on the first field-of-view 311a of the electronic device 124 corresponding to the basement 310. At time T3 shown in FIG. 3C, the electronic device 124 is located in the kitchen 320. As such, in response to determining that the electronic device 124 satisfies the second location-based presentation criterion, the electronic device 124 displays the adapted second portion of the predetermined content associated with the grassland ecosystem overlaid on the second field-of-view 311b of the electronic device 124 corresponding to the kitchen 320. At time T4 shown in FIG. 3D, the electronic device 124 is located in the bedroom 330. As such, in response to determining that the electronic device 124 satisfies the third location-based presentation criterion, the electronic device 124 displays the adapted third portion of the predetermined content associated with the forest ecosystem overlaid on the third field-of-view 311c of the electronic device 124 corresponding to the bedroom 330. At time T5 shown in FIG. 3E, the electronic device 124 is located in the living room 340. As such, in response to determining that the electronic device 124 satisfies the fourth location-based presentation criterion, the electronic device 124 displays the adapted fourth portion of the predetermined content associated with the desert ecosystem overlaid on the fourth field-of-view 311d of the electronic device 124 corresponding to the living room 340.

FIGS. 4A-4C illustrate another XR presentation scenario sequence 400 for generating adapted XR content based on spatial characteristics of a plurality of subsets within a physical environment in accordance with some implementations. While pertinent features are shown, those of ordinary skill in art will appreciate from the present disclosure that various other features have not been illustrated for the sake of brevity and so as not to obscure more pertinent aspects of the example implementations disclosed herein.

FIG. 4A illustrates a first state 401a (e.g., associated with T1 or a first time period) of an example XR presentation scenario 400. In the first state 401a, at least a portion of the physical environment is within a field-of-view 411a of the electronic device 124. In some implementations, the electronic device 124 determines a connectivity matrix between a plurality of subsets within the physical environment and generates additional XR content in order to present the additional XR content based at least in part on the connectivity matrix between the plurality of subsets within the physical environment. In this example, the hallway 404 is not part of the plurality of subsets within the physical environment, but rather corresponds to a space between the plurality of subsets.

As shown in FIG. 4A, the hallway 404 includes a door that leads to a room (e.g., the first subset of the physical environment). Therefore, the electronic device 124 generates additional XR content in order to bridge the plurality of subsets within the physical environment. In some implementations, the additional XR content corresponds to emergent XR content. In some implementations, the additional XR content corresponds to XR content selected from pre-determined content. In some implementations, the additional XR content corresponds to emergent XR content that is generated based XR content portions logically mapped to the previous and subsequent subsets. In some implementations, the one or more navigation options are generated based at least in part on the connectivity matrix. Here, the electronic device 124 generates a navigation option that includes a navigation path 412 based at least in part on the hallway 404. As shown in FIG. 4A, the electronic device 124 presents, on the display 122, a user interface 402 including the hallway 404, the navigation path 412 (optional), and the additional XR content 410a, 410b. At time T2 shown in FIG. 4B, the electronic device 124 moves to the first subset (e.g., the room 406) by following the navigation path 412 in order to satisfy a presentation criterion for displaying adapted XR content.

FIG. 4B illustrates a second state 401b (e.g., associated with T2 or a second time period) of an example XR presentation scenario 400. In comparison to FIG. 4A, the field-of-view of the electronic device 124 changes due to translation movement of the electronic device 124 from the hallway 404 to inside the room 406. As shown in FIG. 4B, in the second state 401b, the field-of-view 411b of the electronic device 124 includes a painting 416 and the door 420. In some implementations, after logically mapping the first XR content portion to the room 406, the electronic device 124 generates adapted XR content (e.g., the virtual agent 418) based at least in part on the first set of spatial characteristics of the room 406. In this example, the first presentation criterion associated with the adapted XR content is location-based. As such, in response to determining that the first presentation criterion is satisfied, the electronic device 124 presents, on the display 122, the user interface 402 including the painting 416, the door 420, and the virtual agent 418 appearing to stand in the room 406.

In some implementations, the electronic device 124 presents one or more XR content items associated with the XR content moving from the first subset to the second subset. The sequence shown in FIG. 4B and 4C depicts a virtual agent 418 associated with the XR content moving from the room 406 to another subset within the physical environment while the field-of-view 411b of the electronic device 124 is stationary.

FIG. 4C illustrates a third state 401c (e.g., associated with T3 or a third time period) of an example XR presentation scenario 400. In comparison to FIG. 4D, the field-of-view 411b of the electronic device is the same, but, at time T3 in FIG. 4C, the virtual agent 418 appears to move from the room 406 (e.g., the first subset) toward another room beyond the door 420 within the physical environment. Accordingly, the electronic device 124 generates a path indicator 414 that allows the user to follow the virtual agent 418 to the other room beyond the door 420 within the physical environment. In some implementations, following the path indicator 414 enables the user to traverse between the room 406 (e.g., the first subset) and the other room beyond the door 420 (e.g., second subset within the physical environment). As such, in FIG. 4C, the electronic device 124 presents, on the display 122, the user interface 402 including the painting 416, the door 420, the virtual agent 418 moving from the room 406 to a second subset, and the path indicator 414 (optional).

Figure 5:
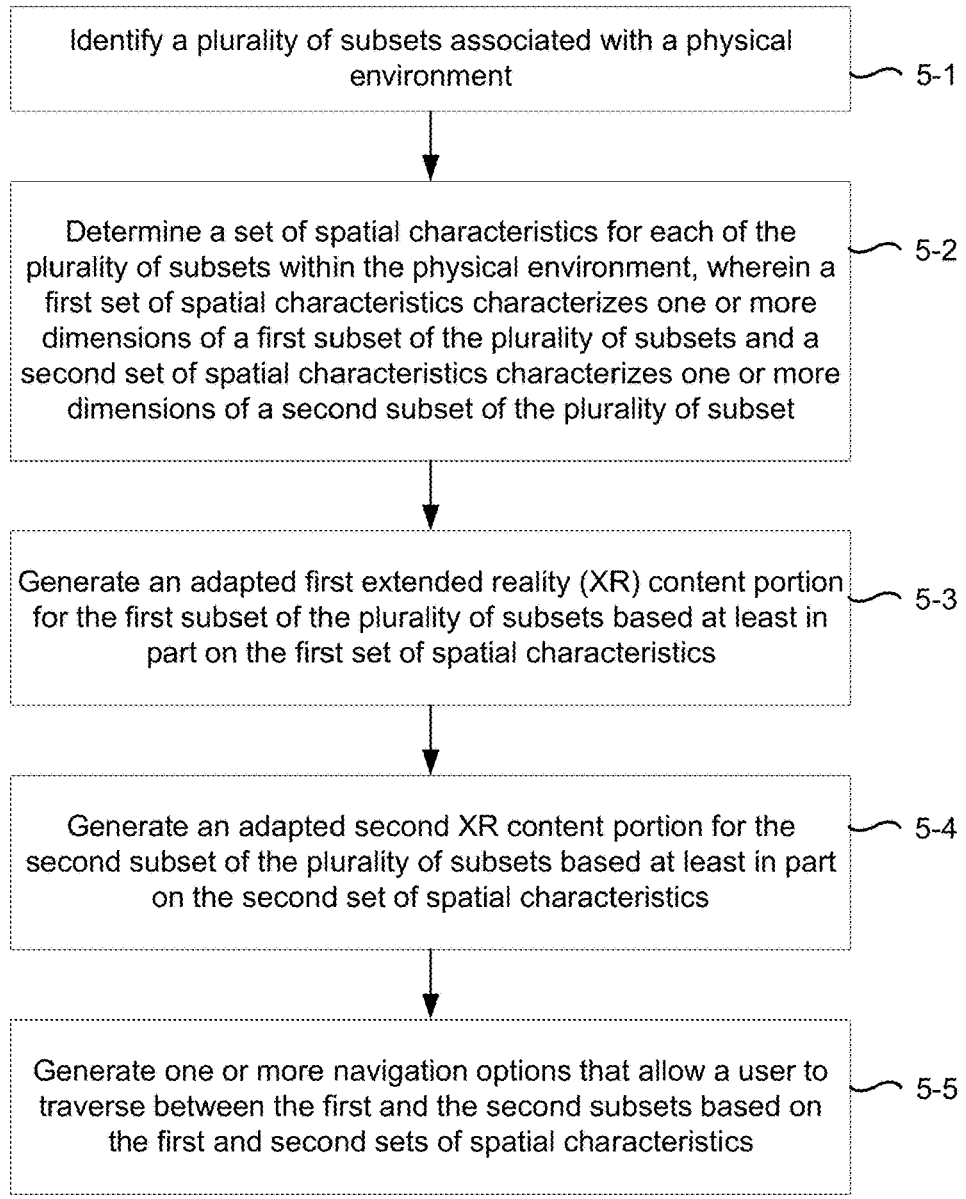
FIG. 5 is a flowchart representation of a method of generating adapted XR content based on spatial characteristics of a plurality of subsets within a physical environment in accordance with some implementations.

FIG. 5 is a flowchart representation of a method 500 of generating adapted XR content based on spatial characteristics of a plurality of subsets within a physical environment in accordance with some implementations. In various implementations, the method 500 is performed at an electronic device (e.g., the electronic device 124 shown in FIGS. 1 and 7, the controller 102 shown in FIGS. 1 and 6, or a suitable combination thereof) with an image sensor, one or more processors, a non-transitory memory, and a display. In various implementations, the method 500 is performed at a computing system (e.g., the electronic device 124 shown in FIGS. 1 and 7, the controller 102 shown in FIGS. 1 and 6, or a suitable combination thereof) with non-transitory memory and one or more processors, wherein the computing system is communicatively coupled to a display device, one or more exterior-facing image sensors, and one or more input devices. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 510, the method 500 includes identifying a plurality of subsets associated with a physical environment (e.g., the physical environment 105 shown in FIG. 1 or the first and second physical environments 202, 204 shown in FIGS. 2A-2D). In some implementations, the plurality of subsets may correspond to portions of a room associated with the physical environment. For example, as shown in FIGS. 2A-2D, the plurality of subsets corresponds to portions of a single room within a first physical environment 202 and a second physical environment 204. In some implementations, the plurality of subsets may correspond to rooms within the physical environment. For example, as shown in FIGS. 3A-3E, the plurality of subsets corresponds to individual rooms (e.g., the basement 310, the kitchen 320, the bedroom 330, and the living room 340) associated with the house 301.

In some implementations, the electronic device determines the plurality of subsets based on physical divisions. For example, with reference to FIG. 3A, if the physical environment corresponds to a house 301, then the electronic device 124 identifies the plurality of subsets based on each individual room (e.g., the basement 310, the kitchen 320, the bedroom 330, and the living room 340). As another example, if the physical environment corresponds to a single room, then the electronic device 124 identifies the plurality of subsets based on the different walls of the single room. As yet another example, if the physical environment corresponds to a single room, then the electronic device 124 identifies the plurality of subsets based on the corners of a room.

In some implementations, the electronic device 124 determines the plurality of subsets based on a metric that is not associated with physical divisions. In some implementations, the electronic device determines the plurality of subsets based on a metric that is not associated with physical divisions. For example, if a physical environment does not include physical divisions, then the electronic device 124 identifies the plurality of subsets by dividing the physical environment in half and identifying a first half of the physical environment as a first subset and the second half of the physical environment as a second subset. As an example, with reference to FIG. 2B, in the first XR presentation scenario 200*a*, the electronic device 124 divides the first physical environment 202 in half and identifies the first half of the first physical environment 202 as a first subset 230*a* and a second subset 232*a*. As another example, also with reference to FIG. 2B, in the second XR presentation scenario 200*b*, the electronic device 124 divides the second physical environment 204 in half and identifies the first half of the second physical environment 204 as a first subset 230*b* and the second half of the second physical environment 204 as a second subset 232*b*.

As represented by block 520, the method 500 includes determining a set of spatial characteristics for each of the plurality of subsets within the physical environment, wherein a first set of spatial characteristics characterizes one or more dimensions of a first subset of the plurality of subsets and a second set of spatial characteristics characterizes one or more dimensions of a second subset of the plurality of subset. In some implementations, the first set of spatial characteristics include at least one of a volumetric size of the first subset of the physical environment, an indication of physical objects within the first subset of the physical environment, a shape of the first subset of the physical environment, or the like. In some implementations, the one or more dimensions may correspond to a width, length, height, or the like of a subset of the plurality of subsets.

For example, as shown in the first XR presentation scenario 200*a* in FIG. 2B, a first set of spatial characteristics for the first subset 230*a* include a volumetric size of the first subset 230*a* based on the x-dimension 207*a*, the y-dimension 209*a*, and the z-dimension 216*a* within the first physical environment 202 and the indication of no physical objects within the first physical environment 202; and a second set of spatial characteristics for the second subset 232*a* include the volumetric size of the second subset 232*a* based on the x-dimension 211*a*, the y-dimension 213*a*, the z-dimension 215*a*, and the indication of no physical objects within the first physical environment 202.

In another example, as shown in the second XR presentation scenario 200*b* in FIG. 2B, a first set of spatial characteristics for the first subset 230*b* include a volumetric size of the first subset 230*b* based on the x-dimension 207*b*, the y-dimension 209*b*, the z-dimension 216*b* within the second physical environment 204 and the indication of physical objects (e.g., the chair 220*c*, the credenza 220*b*, the coffee table 220*e*, and the sofa 210) within the second physical environment 204; and a second set of spatial characteristics for the second subset 232*b* include the volumetric size of the second subset 232*b* based on the x-dimension 211*b*, the y-dimension 213*b*, the z-dimension (215*b*), and the indication of physical objects (e.g., the chair 220*a*, the credenza 220*b*, the coffee tables 220*d*, 220*e*, and the sofa 210) within the second physical environment 204. In some implementations, the spatial characteristics may include a point cloud for a physical environment that is labeled with objects. In some implementations, the electronic device determines the set of spatial characteristics by performing semantic segmentation or instance segmentation. In some implementations, semantic segmentation corresponds to detecting and labeling objects that appear within image data. In some implementations, instance segmentation corresponds to detecting and delineating distinct objects that appear within the image data.

As represented by block 530, the method 500 includes generating an adapted first extended reality (XR) content portion for the first subset of the plurality of subsets based at least in part on the first set of spatial characteristics. Specifically, in some implementations, the electronic device 124 logically maps a first portion of XR content to a first subset that satisfies a first mapping criterion associated with the first portion of XR content. Next, in some implementations, the electronic device 124 generates the adapted first XR content portion by adapting reference XR content (e.g., the first portion of XR content) based on the spatial characteristics of the first subset. Finally, in some implementations, in response to determining that a presentation criterion associated with the adapted first XR content portion is satisfied, the electronic device 124 presents the adapted first XR content portion within the first subset.

As an example, in the first XR presentation scenario 200*a* shown in FIGS. 2B and 2C, after logically mapping the first XR content portion to the first subset 230*a*, the electronic device 124 generates the adapted first XR content portions 240*a*-1, 240*a*-2, 240*a*-3 based at least in part on the x-dimension 207*a*, the y-dimension 209*a*, and the z-dimension 216*a* of the first subset 230*a* within the first physical environment 202. Similarly, also shown in the second XR presentation scenario 200*b* shown in FIGS. 2B and 2C, after logically mapping the first XR content portion to the first subset 230*b*, the electronic device 124 generates the adapted first XR content portions 240*b*-1, 240*b*-2, 240*b*-3 based at least in part on the x-dimension 207*b*, the y-dimension 209*b*, and the z-dimension 216*b* of the first subset 230*b* within the second physical environment 204.

In some implementations, the XR content corresponds to emergent XR content or predetermined XR content. In some implementations, the method 500 further includes generating emergent XR content including the first XR content portion and the second XR content portion. In some implementations, the XR content corresponds to stereoscopic models of objects, characters, or scenery that is associated with emergent content. For example, emergent content may correspond to one or more objective effectuators carrying out actions in order to achieve a particular objective. Continuing with the example, as shown in FIG. 4C, the emergent content corresponds to the virtual agent 418 (e.g., the objective effectuator) carrying out an action of searching for paintings within the physical environment. As another example, as shown in FIG. 4A, the electronic device 124 generates emergent XR content in order to bridge the plurality of subsets within the physical environment.

In some implementations, the method 500 further includes obtaining predetermined content that includes the first XR content portion and the second XR content portion, wherein the first XR content portion and the second XR content portion are obtained from a database or library. In some implementations, the XR content corresponds to stereoscopic models of objects, characters or scenery that is associated with predetermined content. In some implementations, the predetermined content corresponds to content associated with a real-life event, story, movie, television episode, or the like. In some implementations, the first XR content portion is associated with a first thematic scene within predetermined content and the second XR content portion is associated with a second thematic scene within the predetermined content. In some implementations, the predetermined content corresponds to a temporally linear plot, and the adapted first XR content portion is presented before presenting the adapted second XR content portion. For example, as shown in FIGS. 3A-3F, the adapted first XR content portion 314 corresponds to a beginning, the adapted second XR content portion 316 corresponds to a rising action, the adapted third XR content portion 317 corresponds to a climax, the adapted fourth XR content portion 318 corresponds to a falling action, and the adapted fifth XR content portion 319 corresponds to a resolution are associated with a linear plot such that the adapted XR content portions are linked in an ordered manner. As such, continuing with the example shown in FIGS. 3A-3F, the electronic device 124 presents the adapted first XR content portion 314, the adapted second XR content portion 316, the adapted third XR content portion 317, the adapted fourth XR content portion 318, and the adapted fifth XR content portion 319 in an ordered sequence in order for the story or plot to make sense.

In some implementations, the method 500 further includes generating an adapted first XR content portion based at least in part on determining whether the first set of spatial characteristics associated with the first subset satisfies a mapping criterion for the first XR content portion of the predetermined content. In some implementations, the mapping criterion corresponds to spatial criteria for finding a best fit for the adapted first XR content portion. In some implementations, the method 500 further includes in response to determining that the first set of spatial characteristics associated with the first subset satisfies the first mapping criterion, determining a placement for the adapted first XR content portion within the first subset based at least in part on the first set of spatial characteristics of the first subset, wherein presenting an adapted first XR content portion composited with a first pass-through image data includes presenting the adapted XR content in accordance with the placement. For example, as shown in FIG. 3B, the electronic device 124 generates an adapted first XR content portion 314 based at least in part on determining that the dimensions associated with the basement 310 satisfies the first mapping criterion of being the largest room in the house 301 for the first XR content portion of predetermined content. As such, continuing with the example in FIG. 3B, in response to determining that the first set of spatial characteristics associated with the basement 310 satisfies the first mapping criterion of being the largest room in the house 301, the electronic device 124 determines a placement for the adapted first XR content portion 314 within the basement 310 by placing the adapted first XR content portion 314 next to the set of stairs 312. Finally, continuing with the example in FIG. 3B, the electronic device 124 presents, on the display 122, the user interface 302 including the set of stairs 312 and the adapted first XR content portion 314 composited with a first pass-through image data in accordance with the placement.

As represented by block 540, the method 500 includes generating an adapted second XR content portion for the second subset of the plurality of subsets based at least in part on the second set of spatial characteristics. Specifically, in some implementations, the electronic device 124 logically maps a second portion of XR content to a second subset that satisfies a second mapping criterion associated with the second portion of XR content. Next, in some implementations, the electronic device 124 generates the adapted second XR content portion by adapting reference XR content (e.g., the second portion of XR content) based on the spatial characteristics of the second subset. Finally, in some implementations, in response to determining that a presentation criterion associated with the adapted second XR content portion is satisfied, the electronic device 124 presents the adapted second XR content portion within the second subset.

As an example, in the first XR presentation scenario 200a shown in FIGS. 2B and 2C, after logically mapping the adapted second XR content portion to the second subset 232a, the electronic device 124 generates the adapted second XR content portions 242a-1, 242a-2, 242a-3, and 242-4 based at least in part on the x-dimension 211a, the y-dimension 213a, and the z-dimension 215a of the second subset 232a within the first physical environment 204. Similarly, also shown in the second XR presentation scenario 200b in FIGS. 2B and 2C, after logically mapping the second XR content portion to the second subset 232b, the electronic device 124 generates the adapted second XR content portions 242b-1, 242b-3 based at least in part on the x-dimension 211b, the y-dimension 213b, and the z-dimension 215b of the second subset 232b within the second physical environment 204.

As represented by block 550, the method 500 includes generating one or more navigation options that allow a user to traverse between the first and the second subsets based on the first and second sets of spatial characteristics. In some implementations, the navigation options include at least one of a path indicator between the first and the second subsets, a circular path between the first and the second subsets, and a determination of a navigation path between the first and the second subsets. For example, as shown in the first XR presentation scenario 200a in FIG. 2D, the electronic device 124 generates a first navigation path 217a in the first physical environment 202 in order to traverse between the first subset 230a to the second subset 232a within the first physical environment 202. As another example, as shown in the second XR presentation scenario 200b in FIG. 2D, the electronic device 124 generates a second navigation path 217b corresponding to a circular path in the second physical environment 204 in order to traverse between the first subset 230b to the second subset 232b within the second physical environment 204. As yet another example, as shown in FIG. 3A, the electronic device 124 generates a navigation path 303 in order to allow the user to traverse between a plurality of subsets (e.g., a basement 310, a kitchen 320, a bedroom 330, and a living room 340) within the house 301. Finally, as another example, as shown in FIG. 4C, the electronic device 124 generates a path indicator 414 in order to allow the user to traverse to a subsequent subset within the physical environment. In some implementations, the navigation option includes detecting a user input such as a physical movement from the user or a head rotation of the user. In some implementations, the navigation option includes a user navigating between subsets by turning his head or physically walking to a subsequent subset.

In some implementations, the method 500 further includes in response to determining that first presentation criterion is satisfied, presenting, on the display, the adapted first XR content portion overlaid on a first field-of-view of the device that corresponds to the first subset of the physical environment; and in response to determining that second presentation criterion is satisfied, presenting, on the display, the adapted second XR content portion overlaid on a second field-of-view of the device that corresponds to the second subset within the physical environment. In some implementations, the presentation criterion may correspond to at least one of a temporal criterion associated with the adapted first XR content portion, coordinates of the first subset, coordinates of the second subset, adjacency between the first XR content portion and the second XR content portion, and a location of the electronic device. For example, the presentation criterion may correspond to an adjacency between the first XR content portion and the second XR content portion if the first subset mapped to the first XR content portion and the second subset mapped to the second XR content portion are located in close proximity to each other. Continuing with the example, the adjacency presentation criterion enables the electronic device 124 to display a transition between presenting the first XR content portion and the second XR content portion that is practically immediate and does not include a prolonged delay between presenting the first XR content portion and the second XR content portion. As another non-limiting example, the presentation criterion may correspond to a temporal time limit if there is more than one subset within a single room, or if there are not enough rooms to present all XR content. For example, as shown in FIGS. 3E and 3F, the electronic device 124 determines whether a presentation criterion (e.g., temporal parameter associated with the predetermined content) is satisfied by checking the current time before transitioning between presenting the adapted fourth XR content portion 318 and the adapted fifth XR content portion 319. Continuing with the example shown in FIGS. 3E and 3F, after the time period associated with the adapted fourth XR content portion 318 elapses, the electronic device 124 presents the adapted fifth XR content portion 319 in the living room 340.

As a non-limiting example, the first presentation criterion may be satisfied based at least in part on when the electronic device or user is proximate to the first subset. As an example, in FIG. 3B, the presentation criterion is satisfied when the electronic device 124 is proximate to the first subset (e.g., the basement 310). As another example, in FIG. 4B, the presentation criterion is satisfied when the electronic device 124 is located within a first subset (e.g., the room 406). In some implementations, the method 500 further includes presenting, on the display, one or more XR content items associated with the first XR content portion moving from the first subset to the second subset. For example, as shown in FIGS. 4B and 4C, the virtual agent 418 is initially presented in a first subset (e.g., the room 406) at time T2 in FIG. 4B and then moves from the first subset to a second subset at time T3 in FIG. 4C.

In some implementations, a first XR content portion includes a default appearance from which the adaption takes place. In some implementations, generating adapted XR content includes at least one of adding, removing, scaling, or modifying a set of available interactions associated with the XR content to the spatial characteristics of the plurality of subsets.

In some implementations, the method 500 further includes adding one or more XR content items to the first XR content portion based at least in part on the first set of spatial characteristics of the first subset. For example, after adapting the first XR content portion to a first subset, if there is ample room left in the first subset, the electronic device may add one or more XR content items to the first XR content portion in order to fill out the first subset.

In some implementations, the method 500 further includes removing one or more XR content items from the first XR content portion based at least in part on the first set of spatial characteristics of the first subset. In some implementations, the XR content portion may be critical or non-critical such that the electronic device may decide to remove the non-critical XR content portions rather than the critical XR portions. In some implementations, the owner or the developer of the XR content determines what XR content portions are critical or non-critical. As an example, as shown in the first XR presentation scenario 200*a* in FIG. 2C, the electronic device 124 generates the adapted second XR content 242*a*-1, 242*a*-2, 242*a*-3, 242*a*-4 in the second subset 232*a* of the first physical environment 202. Similarly, as shown in the second XR presentation scenario 200*b* in FIG. 2C, the electronic device 124 also generates the adapted second XR content 242*b*-1, 242*b*-3 in the second subset 232*b* of the second physical environment 204, but the electronic device 124 removes the adapted XR content 242*a*-2, 242*a*-4 in the second physical environment 204 due to the smaller dimensions of the second subset 232*b* and objects (e.g., chair 220*a*, credenza 220*b*, coffee tables 220*d*, 220*e*, and sofa 210) within the second physical environment 204.

In some implementations, the method 500 further includes scaling one or more XR content items associated with the first XR content portion based at least in part on the first set of spatial characteristics of the first subset. For example, as shown in the first XR presentation scenario 200*a* in FIG. 2C, the electronic device 124 generates adapted first XR content 240*a*-1, 240*a*-2, 240*a*-3 within the first subset 230*a* in the first physical environment 202. Similarly, as shown in the second XR presentation scenario 200*b* in FIG. 2C, the electronic device 124 also generates adapted first XR content 240*b*-1, 240*b*-2, 240*b*-3 within the first subset 230*b* in the second physical environment 204. However, compared to the first XR presentation scenario 200*a*, the adapted first XR content 240-*b*1, 240*b*-2, 240*b*-3 in the second XR presentation scenario 200*b* is scaled down to a smaller size than the adapted first XR content 240*a*-1, 240*a*-2, 240*a*-3 in the first XR presentation scenario 200*a* due to the difference in dimensions between the first physical environment 202 and the second physical environment 204.

In some implementations, the method 500 further includes modifying a set of available interactions associated with the first XR content portion based at least in part on the first set of spatial characteristics of the first subset. For example, as shown in the first XR presentation scenario 200*a*, the user 10 interacts with the adapted first XR content portions 240*a*-2, 240*a*-3 by walking 360 degrees around the adapted first XR content portion 240*a*-2, 240*a*-3 in order to see every angle of the adapted first XR content portions 240*a*-2, 240*a*-3. However, as shown in the second XR presentation scenario 200*b*, the user 10 may not be able to interact with the adapted first XR content portions 240*b*-2, 240*b*-3 by walking 360 degrees around the adapted first XR content portions 240*b*-2, 240*b*-3 in the same manner as the first XR presentation scenario 200*a*. Instead, in the second XR presentation scenario 200*b*, the user 10 is limited to walking around certain portions of the adapted first XR content portions 240*b*-2, 240*b*-3 due to the smaller size of the second physical environment 204 and the plurality of objects within the second physical environment 204.

In some implementations, the method 500 further includes identifying an object within the first subset that satisfies an object presentation criterion; and in response to determining that the object within the first subset satisfies the object presentation criterion, placing the adapted first XR content portion within the object identified in the first subset. In some implementations, the object presentation criterion corresponds to a volumetric or an access threshold. For example, the electronic device may identify a trunk within a living room that satisfies an object presentation criteria of being a specific volumetric size and an access threshold of being able to open at the top; and in response to determining that the trunk within the living room satisfies both the object presentation criteria of being the specific volumetric size and the access threshold of being able to open at the top, placing the adapted first XR content portion within the trunk identified in the living room.

In some implementations, the method 500 further includes determining a connectivity matrix between the plurality of subsets within the physical environment; and generating additional XR content in order to present the additional XR content based at least in part on the connectivity matrix between the plurality of subsets within the physical environment. In some implementations, the one or more navigation options are generated based at least in part on the connectivity matrix. For example, as shown in FIG. 4A, the electronic device determines a connectivity matrix between rooms within the physical environment and generates a navigation path 412 based at least in part on the connectivity matrix. Continuing with the example in FIG. 4A, the electronic device generates additional XR content 410*a*, 410*b* by presenting the additional XR content in the hallway 404 in order to bridge the plurality of subsets within the physical environment.

In some implementations, the method 500 further includes obtaining a first set of environmental characteristics associated with the first subset and a second set of environmental characteristics associated with the second subset, wherein: generating the adapted first XR content portion is based at least in part on the first set of spatial characteristics of the first subset and the first set of environmental characteristics associated with the first subset, and generating the adapted second XR content portion is based at least in part on the second set of spatial characteristics of the second subset and the second set of environmental characteristics associated with the second subset. In some implementations, adapting the XR content portions may be based on environmental characteristics such as a type of room, temperature information, lighting information, objects within the physical environment, a time of day, or background color of the physical environment.

As a non-limiting example and with reference to FIG. 3A, the electronic device 124 may be configured to present portions of predetermined content corresponding to different ecosystems based on the environmental characteristics of the subset within the physical environment. Continuing with the non-limiting example, a first portion of predetermined content corresponds to a subterranean ecosystem, a second portion of predetermined content corresponds to a grassland ecosystem, a third portion of predetermined content corresponds to a forest ecosystem, and a fourth portion of predetermined content corresponds to a desert ecosystem. Referring to FIG. 3A, the electronic device 124 may obtain environmental characteristics associated with the different rooms within the house 301. In this example, the environmental characteristics include a type of room, temperature information, or lighting information.

Accordingly, the electronic device 124 presents the adapted first XR content portion 314 corresponding to the subterranean ecosystem in the user interface 302 of the field-of-view 311*a* of the basement 310 based at least in part on environmental characteristics such as the basement 310 being located underground, the cool temperature of the basement 310, or the dark lighting conditions of the basement 310. As another example, the electronic device 124 presents the adapted second XR content portion 316 corresponding to the grassland ecosystem in the user interface 302 of the field-of-view 311*b* of the kitchen 320 based at least in part on environmental characteristics such as the lighting characteristics of the kitchen 320, the warm temperature of the kitchen 320, or the fact that the room is a kitchen 320. As a further example, the electronic device 124 presents the adapted third XR content portion 317 corresponding to the forest ecosystem in the user interface 302 of the field-of-view 311*c* of the bedroom 330 based at least in part on environmental characteristics such as the bedroom being located on the second story of the house 301 or the lighting conditions of the bedroom 330. As yet another example, the electronic device 124 may present the adapted fourth XR content portion 318 corresponding to the desert ecosystem in the user interface 302 of the field-of-view 311*d* of the living room 340 based at least in part on environmental characteristics such as the hot temperature of the living room 340.

In some implementations, the method 500 further includes, obtaining, via an exterior-facing image sensor of the electronic device, image data that correspond to the physical environment, wherein identifying the plurality of subsets within the physical environment is based at least in part on the image data and determining the sets of spatial characteristics for the plurality of subsets within the physical environment is based at least in part on the image data frames. In some implementations, the image data corresponds to video pass-through of other optical information. In some implementations, the image data correspond to first video pass-through image data or second video pass-through image data. In some implementations, if the image data correspond to video pass-through, then the adaptive XR content portion may be composited into the video pass-through content of the live scene. In some implementations, if the display 122 corresponds to an additive display that enables optical see-through of the physical environment, then electronic device 124 presents XR content by projecting or displaying the adaptive XR content portion on the additive display, which is, in turn, overlaid on the physical environment from the perspective of the user.

Figure 6:
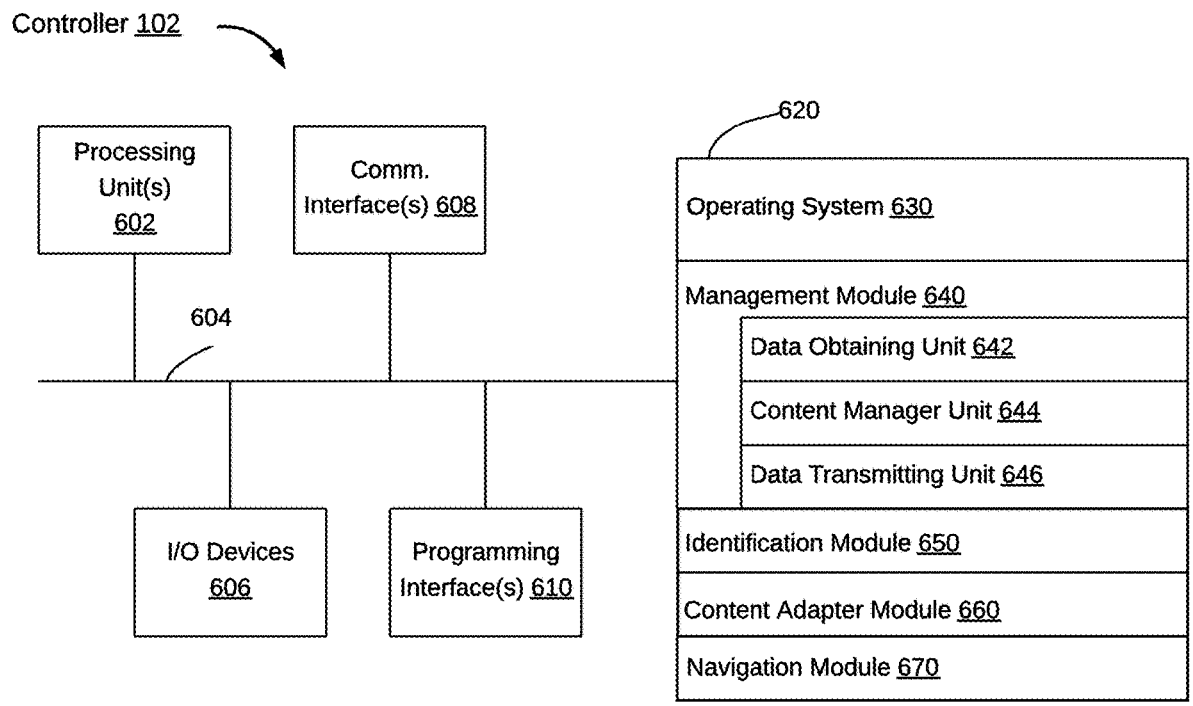
FIG. 6 is a block diagram of an example controller in accordance with some implementations.

FIG. 6 is a block diagram of an example controller (e.g., the controller 102 shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the controller 102 includes one or more processing units 602 (e.g., microprocessors, application-specific integrated-circuits (ASICs), field-programmable gate arrays (FPGAs), graphics processing unit (GPUs), central processing units (CPUs), processing cores, and/or the like), one or more input/output (I/O) devices and sensors 606, one or more communications interface 608 (e.g., universal serial bus (USB), IEEE 802.3x, IEEE 802.11x, IEEE 802.16x, global system for mobile communications (GSM), code division multiple access (CDMA), time division multiple access (TDMA), global positioning systems (GPS), infrared (IR), BLUETOOTH, ZIGBEE, and/or the like type interfaces), one or more programming (e.g., I/O) interfaces 610, a memory 620, and one or more communication buses 604 for interconnecting these and various other components.

In some implementations, the one or more communication buses 604 include circuitry that interconnects and controls communications between system components. In some implementations, the one or more I/O devices and sensors include at least one of a keyboard, a mouse, a touchpad, a joystick, one or more microphones, one or more speakers, one or more image sensors, one or more displays, and/or the like.

The memory 620 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules, and data structures, or a subset thereof including an operating system 630, a management module 640, an identification module 650, a content adapter module 660, and a navigation module 670. In some implementations, one or more instructions are included in a combination of logic and non-transitory memory.

The operating system 630 includes procedures for handling various basic system services and for performing hardware-dependent tasks.

In some implementations, the management module 640 is configured to render, manage, and/or coordinate one or more user interfaces (e.g., the XR environment 128 shown in FIG. 1, the user interface 302 shown in FIGS. 3B-3F, or the user interface 402 shown in FIGS. 4A-4C) for one or more devices associated with different users. To that end, in various implementations, the management module 640 includes a data obtaining unit 642, a content manager unit 644, and a data transmitting unit 646.

Figure 7:
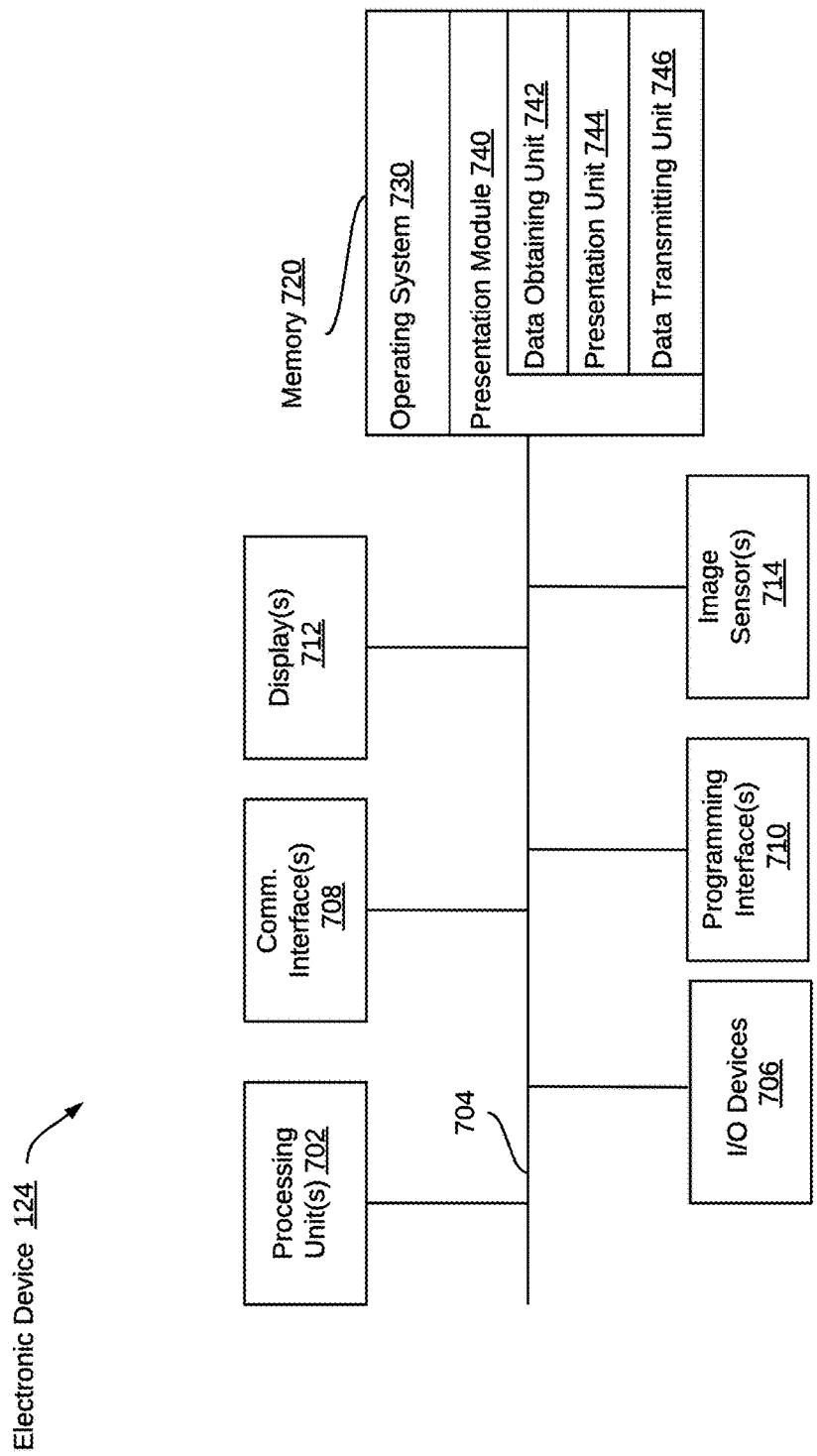
FIG. 7 is a block diagram of an example device in accordance with some implementations.

In some implementations, the data obtaining unit 642 is configured to obtain data (e.g., presentation data, user interaction data, sensor data, location data, etc.) from at least the electronic device 124 shown in FIGS. 1 and 7. To that end, in various implementations, the data obtaining unit 642 includes instructions and/or logic therefor, and heuristics and metadata therefor.

In some implementations, the content manager unit 644 is configured to manage and coordinate the user interface presented to the user by the electronic device 124 shown in FIGS. 1 and 7. To that end, in various implementations, the content manager unit 644 includes instructions and/or logic therefor, and heuristics and metadata therefor.

In some implementations, the data transmitting unit 646 is configured to transmit data (e.g., presentation data, location data, etc.) to at least the electronic device 124 shown in FIGS. 1 and 7. To that end, in various implementations, the data transmitting unit 646 includes instruction and/or logic therefor, and heuristics and metadata therefor.

In some implementations, the identification module 650 is configured to identify a plurality of subsets associated with a physical environment and determine a set of spatial characteristics for each of the plurality of subsets within the physical environment. To that end in various implementations, the identification module 650 includes instruction and/or logic therefor, and heuristics and metadata therefor.

In some implementations, the content adapter module 660 is configured to logically map a portion of XR content to a subset that satisfies mapping criterion by identifying the subset that is best suited for each content portion and to adapt the portion of the XR content from reference XR content to the spatial characteristics of the identified subset. To that end in various implementations, the content adapter module 660 includes instruction and/or logic therefor, and heuristics and metadata therefor.

In some implementations, the navigation module 670 is configured to generate one or more navigation options that allow a user to traverse between the first subset and second subset. To that end in various implementations, the navigation module 670 includes instructions and/or logic therefor, and heuristics and metadata therefor.

Although the management module 640, the identification module 650, the content adapter module 660 and the navigation module 670 are shown as residing on a single device (e.g., the controller 102), it should be understood that in some implementations, any combinations of the management module 640, the identification module 650, the content adapter module 660 and the navigation module 670 may be located in separate computing devices.

In some implementations, the functionalities of the controller 102 are provided by and/or combined with the electronic device 124 shown below in FIG. 7. Moreover, FIG. 6 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 7 is a block diagram of an example electronic device 124 (e.g., a mobile phone, tablet, laptop, near-eye system, etc.) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the electronic device 124 includes one or more processing units 702 (e.g., microprocessors, ASICs, FPGAs, GPUs, CPUs, processing cores, and/or the like), one or more I/O devices and sensors 706, one or more communications interfaces 708 (e.g., USB, IEEE 802.3x, IEEE 802.11x, IEEE 802.16x, GSM, CDMA, TDMA, GPS, IR, BLUETOOTH, ZIGBEE, and/or the like type interfaces), one or more programming interfaces 710, one or more displays 712, one or more image sensors 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more displays 712 are capable of presenting a user interface (e.g., the XR environment 128 shown in FIG. 1, the user interface 302 shown in FIGS. 3B-3F, or the user interface 402 shown in FIGS. 4A-4C) or XR content. In some implementations, the one or more displays 712 are also configured to present flat video content to the user (e.g., a 2-dimensional or "flat" audio video interleave (AVI), flash video (FLV), Windows Media Video (WMV), or the like file associated with a TV episode or a movie, or live video pass-through of the operating environments. In some implementations, the one or more displays 712 correspond to an additive display, holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical systems (MEMS), and/or the like display types. In some implementations, the one or more displays 712 correspond to diffractive, reflective, polarized, holographic, etc. waveguide displays. For example, the electronic device 124 includes a single display. In another example, the electronic device 124 includes a display for each eye of the user.

In some implementations, the one or more image sensors 714 are configured to obtain image data frames. For example, the one or more image sensors 714 correspond to one or more RGB cameras (e.g., with a CMOS image sensor, or a CCD image sensor), infrared (IR) image sensors, event-based cameras, and/or the like.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and a presentation module 740.

The optional operating system 730 includes procedures for handling various basic system services and for performing hardware dependent tasks. In some implementations, the presentation module 740 is configured to present user interfaces or XR content to the user via the one or more displays 712. To that end, in various implementations, the presentation module 740 includes a data obtaining unit 742, a presentation unit 744, and a data transmitting unit 746.

In some implementations, the data obtaining unit 742 is configured to obtain data (e.g., presentation data, interaction data, location data, etc.) from at least one of the one or more I/O devices and sensors 706 associated with the electronic device 124 or the controller 102 shown in FIGS. 1 and 6. To that end, in various implementations, the data obtaining unit 742 includes instructions and/or logic therefor, and heuristics and metadata therefor.

In some implementations, the presentation unit 744 is configured to present a user interface (e.g., the XR environment 128 shown in FIG. 1, the user interface 302 shown in FIGS. 3B-3F, or the user interface 402 shown in FIGS. 4A-4C) or an XR experience via the one or more displays 712. To that end, in various implementations, the presentation unit 744 includes instructions and/or logic therefor, and heuristics and metadata therefor.

In some implementations, the data transmitting unit 746 is configured to transmit data (e.g., presentation data, location data, etc.) to the controller 102 shown in FIGS. 1 and 6. To that end, in various implementations, the data transmitting unit 746 includes instructions and/or logic therefor, and heuristics and metadata therefor.

Although the data obtaining unit 742, the presentation unit 744, and the data transmitting unit 746 are shown as residing on a single device (e.g., the electronic device 124 shown in FIG. 1 or 7), it should be understood that in some implementations, any combination of the data obtaining unit 742, the presentation unit 744, and the data transmitting unit 746 may be located in separate computing devices. In some implementations, the functions and/or components of the controller 102 are combined with or provided by the electronic device 124.

Moreover, FIG. 7 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first subset could be termed a second subset, and, similarly, a second subset could be termed a first subset, which changing the meaning of the description, so long as the occurrences of the "first subset" are renamed consistently and the occurrences of the "second subset" are renamed consistently. The first subset and the second subset are both subsets, but they are not the same subset.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at an electronic device including an image sensor, one or more processors, a non-transitory memory, and a display:
        identifying a plurality of subsets associated with a physical environment;
        determining a set of spatial characteristics for each of the plurality of subsets within the physical environment, wherein a first set of spatial characteristics characterizes one or more dimensions of a first subset of the plurality of subsets, and a second set of spatial characteristics characterizes one or more dimensions of a second subset of the plurality of subsets;
        generating an adapted first extended reality (XR) content portion for the first subset of the plurality of subsets based on the one or more dimensions of the first subset;
        generating an adapted second XR content portion for the second subset of the plurality of subsets based on the one or more dimensions of the second subset;
        generating one or more navigation options that allow a user to traverse between the first and second subsets based on the first and second sets of spatial characteristics; and
        indicating the one or more navigation options by displaying a movement of an XR content item associated with the adapted first XR content portion from the first subset to the second subset.

2. The method of claim 1, wherein the first set of spatial characteristics includes at least one of a volumetric size of the first subset of the plurality of subsets, an indication of physical objects within the first subset of the plurality of subsets, and a shape of the first subset of the plurality of subsets.

3. The method of claim 1, wherein the one or more navigation options include at least one of a path indicator between the first and second subsets of the plurality of subsets and a circular path between the first and second subsets of the plurality of subsets.

4. The method of claim 1, further comprising:
    determining a connectivity matrix between the plurality of subsets within the physical environment;
    generating additional XR content based on the connectivity matrix; and
    presenting the additional XR content based at least in part on the connectivity matrix between the plurality of subsets within the physical environment.

5. The method of claim 4, wherein the one or more navigation options are generated based at least in part on the connectivity matrix.

6. The method of claim 1, wherein generating the adapted first XR content portion is based at least in part on determining whether the first set of spatial characteristics associated with the first subset of the plurality of subsets satisfies a first mapping criterion for a first XR content portion of predetermined XR content.

7. The method of claim 6, further comprising:
    in response to determining that the first set of spatial characteristics associated with the first subset of the plurality of subsets satisfies the first mapping criterion, determining a placement for the adapted first XR content portion within the first subset of the plurality of subsets based at least in part on the first set of spatial characteristics of the first subset of the plurality of subsets, wherein presenting the adapted first XR content portion comprises compositing the adapted first XR content portion with a first pass-through image data in accordance with the placement.

8. The method of claim 1, further comprising:
    in response to determining that first presentation criterion is satisfied, presenting, on the display, the adapted first XR content portion overlaid on a first field-of-view of the device that corresponds to the first subset of the plurality of subsets of the physical environment; and
    in response to determining that second presentation criterion is satisfied, presenting, on the display, the adapted second XR content portion overlaid on a second field-of-view of the device that corresponds to the second subset of the plurality of subsets of the physical environment.

9. The method of claim 8, wherein the first presentation criterion corresponds to at least one of a temporal criterion associated with the adapted first XR content portion, coordinates of the first subset of the plurality of subsets, coordinates of the second subset of the plurality of subsets, adjacency between the first XR content portion and the second XR content portion, and a location of the electronic device.

10. The method of claim 1, further comprising:
    obtaining a first set of environmental characteristics associated with the first subset of the plurality of subsets and a second set of environmental characteristics associated with the second subset of the plurality of subsets, wherein:
        generating the adapted first XR content portion is based at least in part on the first set of spatial characteristics of the first subset of the plurality of subsets and the first set of environmental characteristics associated with the first subset of the plurality of subsets, and
        generating the adapted second XR content portion is based at least in part on the second set of spatial characteristics of the second subset of the plurality of subsets and the second set of environmental characteristics associated with the second subset of the plurality of subsets.

11. The method of claim 10, wherein environmental characteristics among the first set of environmental characteristics correspond to at least one of a type of room, temperature information, lighting information, objects within the physical environment, a time of day, and background color of the physical environment.

12. The method of claim 1, wherein generating the adapted first XR content portion includes adding one or more XR content items to a first XR content portion of predetermined XR content based at least in part on the first set of spatial characteristics of the first subset of the plurality of subsets.

13. The method of claim 1, wherein generating the adapted first XR content portion includes removing one or more XR content items from a first XR content portion of predetermined XR content based at least in part on the first set of spatial characteristics of the first subset of the plurality of subsets.

14. The method of claim 1, wherein generating the adapted first XR content portion includes modifying a set of available interactions associated with a first XR content portion of predetermined XR content based at least in part on the first set of spatial characteristics of the first subset of the plurality of subsets.

15. The method of claim 1, wherein the first XR content portion is associated with a first thematic scene within predetermined XR content and the second XR content portion is associated with a second thematic scene within the predetermined XR content.

16. The method of claim 15, wherein the predetermined XR content corresponds to a temporally linear plot, and the adapted first XR content portion is presented before presenting the adapted second XR content portion.

17. The method of claim 1, further comprising:
identifying an object within the first subset of the plurality of subsets that satisfies an object presentation criterion; and
in response to determining that the object within the first subset of the plurality of subsets satisfies the object presentation criterion, placing the adapted first XR content portion within the object identified in the first subset of the plurality of subsets.

18. The method of claim 1, further comprising:
obtaining predetermined XR content that includes a first XR content portion that is adapted into the adapted first XR content portion and a second XR content portion that is adapted into the adapted second XR content portion, wherein the first XR content portion and the second XR content portion are obtained from a database.

19. The method of claim 1, further comprising:
obtaining, via an exterior-facing image sensor of the electronic device, image data that corresponds to the physical environment, wherein identifying the plurality of subsets within the physical environment is based at least in part on the image data and determining the first and second sets of spatial characteristics for the plurality of subsets within the physical environment is based at least in part on the image data.

20. The method of claim 1, wherein the XR content item represents a virtual agent and displaying the movement of the XR content item includes displaying a movement of the virtual agent from the first subset to the second subset.

21. An electronic device comprising:
an image sensor;
a display;
one or more processors;
a non-transitory memory; and
one or more programs stored in the non-transitory memory, which, when executed by the one or more processors, cause the electronic device to:
identify a plurality of subsets associated with a physical environment;
determine a set of spatial characteristics for each of the plurality of subsets within the physical environment, wherein a first set of spatial characteristics characterizes one or more dimensions of a first subset of the plurality of subsets, and a second set of spatial characteristics characterizes one or more dimensions of a second subset of the plurality of subsets;
generate an adapted first extended reality (XR) content portion for the first subset of the plurality of subsets based on the one or more dimensions of the first subset;
generate an adapted second XR content portion for the second subset of the plurality of subsets based on the one or more dimensions of the second subset;
generate one or more navigation options that allow a user to traverse between the first and second subsets based on the first and second sets of spatial characteristics; and
indicate the one or more navigation options by displaying a movement of an XR content item associated with the adapted first XR content portion from the first subset to the second subset.

22. The electronic device of claim 21, wherein the XR content item represents a virtual agent and displaying the movement of the XR content item includes displaying a movement of the virtual agent from the first subset to the second subset.

23. The electronic device of claim 21, wherein the first set of spatial characteristics includes at least one of a volumetric size of the first subset of the plurality of subsets, an indication of physical objects within the first subset of the plurality of subsets, and a shape of the first subset of the plurality of subsets.

24. The electronic device of claim 21, wherein generating the adapted first XR content portion includes adding one or more XR content items to a first XR content portion of predetermined XR content based at least in part on the first set of spatial characteristics of the first subset of the plurality of subsets.

25. A non-transitory memory storing one or more programs, which, when executed by one or more processors of an electronic device with an image sensor and a display, cause the electronic device to:
identify a plurality of subsets associated with a physical environment;
determine a set of spatial characteristics for each of the plurality of subsets within the physical environment, wherein a first set of spatial characteristics characterizes one or more dimensions of a first subset of the plurality of subsets, and a second set of spatial characteristics characterizes one or more dimensions of a second subset of the plurality of subsets;
generate an adapted first extended reality (XR) content portion for the first subset of the plurality of subsets based on the one or more dimensions of the first subset;
generate an adapted second XR content portion for the second subset of the plurality of subsets based on the one or more dimensions of the second subset;
generate one or more navigation options that allow a user to traverse between the first and second subsets based on the first and second sets of spatial characteristics; and indicate the one or more navigation options by displaying a movement of an XR content item associated with the adapted first XR content portion from the first subset to the second subset.

26. The non-transitory memory of claim 25, wherein the XR content item represents a virtual agent and displaying the movement of the XR content item includes displaying a movement of the virtual agent from the first subset to the second subset.

27. The non-transitory memory of claim 25, wherein the one or more programs further cause the electronic device to:
   in response to determining that first presentation criterion is satisfied, present, on the display, the adapted first XR content portion overlaid on a first field-of-view of the device that corresponds to the first subset of the plurality of subsets of the physical environment; and
   in response to determining that second presentation criterion is satisfied, present, on the display, the adapted second XR content portion overlaid on a second field-of-view of the device that corresponds to the second subset of the plurality of subsets of the physical environment.

28. The non-transitory memory of claim 25, wherein generating the adapted first XR content portion includes removing one or more XR content items from a first XR content portion of predetermined XR content based at least in part on the first set of spatial characteristics of the first subset of the plurality of subsets.

* * * * *